US012676693B1

(12) United States Patent
Kelly et al.

(10) Patent No.: US 12,676,693 B1
(45) Date of Patent: Jul. 7, 2026

(54) SYSTEM AND METHOD FOR BLOCKING OF LOW POWER WIDE AREA NETWORKS

(71) Applicant: SR Technologies, Inc., Sunrise, FL (US)

(72) Inventors: Kyle Patrick Kelly, Palm Beach Gardens, FL (US); Phillip Louis Roccapriore, Fort Lauderdale, FL (US); Graham K. Smith, Boca Raton, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 19/429,812

(22) Filed: Dec. 22, 2025

Related U.S. Application Data

(60) Provisional application No. 63/741,761, filed on Jan. 3, 2025.

(51) Int. Cl.
*H04K 3/00* (2006.01)
*H04L 5/00* (2006.01)
*H04W 28/06* (2009.01)

(52) U.S. Cl.
CPC ............. *H04K 3/41* (2013.01); *H04L 5/0048* (2013.01); *H04W 28/06* (2013.01)

(58) Field of Classification Search
CPC ........ H04K 3/41; H04L 5/0048; H04W 28/06
USPC .......................................................... 455/1
See application file for complete search history.

(56) References Cited

U.S. PATENT DOCUMENTS

| | | | | |
|---|---|---|---|---|
| 6,091,456 A | * | 7/2000 | Schaas ................. | H04N 21/482 |
| | | | | 348/460 |
| 10,530,628 B1 | * | 1/2020 | Yoo ..................... | H04L 27/2676 |
| 12,003,660 B2 | * | 6/2024 | Bernardi .............. | H04L 67/104 |
| D1,094,076 S | * | 9/2025 | Baynard ........................ | D8/370 |
| 2008/0020706 A1 | * | 1/2008 | Payne ................. | H04B 1/1027 |
| | | | | 455/41.2 |
| 2016/0020932 A1 | * | 1/2016 | Sornin ..................... | H04B 1/69 |
| | | | | 375/139 |
| 2018/0062873 A1 | * | 3/2018 | Chiang ................... | H04W 4/18 |
| 2018/0252796 A1 | * | 9/2018 | Qu ............................. | G01S 5/26 |
| 2019/0158335 A1 | * | 5/2019 | Stanciu .............. | H04L 27/2657 |
| 2019/0209022 A1 | * | 7/2019 | Sobol ................. | A61B 5/02055 |
| 2019/0215369 A1 | * | 7/2019 | Pry ......................... | H04W 4/38 |
| 2019/0319868 A1 | * | 10/2019 | Svennebring ......... | H04W 24/08 |
| 2021/0014177 A1 | * | 1/2021 | Kasichainula ........ | H04L 49/901 |
| 2021/0014789 A1 | * | 1/2021 | Zhao ................. | H04W 52/0229 |
| 2022/0085860 A1 | * | 3/2022 | Bali ..................... | H04B 17/345 |
| 2022/0209812 A1 | * | 6/2022 | Hall ......................... | H04B 1/69 |
| 2022/0209813 A1 | * | 6/2022 | Hall ......................... | H04B 1/69 |
| 2022/0209814 A1 | * | 6/2022 | Hall ......................... | H04B 1/69 |

(Continued)

*Primary Examiner* — April G Gonzales

(74) *Attorney, Agent, or Firm* — Goodwin Procter LLP

(57) ABSTRACT

A method for monitoring and blocking data packets while maintaining the ability to demodulate blocked data packets including receiving, at a receiver, a first data packet and analyzing a first portion of the first data packet to determine one or more attributes of the first data packet. A blocking signal is transmitted based on the one or more attributes of the first data packet. Receipt of the first data packet is discontinued at the receiver during transmission of the blocking signal and receipt of a remainder of the first data packet is continued at the receiver following transmission of the blocking signal. Data included in the remainder of the first data packet is demodulated at the receiver.

20 Claims, 14 Drawing Sheets

15

(56) References Cited

U.S. PATENT DOCUMENTS

| | | | |
|---|---|---|---|
| 2022/0209815 A1* | 6/2022 | Hall | H04B 1/7075 |
| 2022/0209890 A1* | 6/2022 | Hall | H03M 13/616 |
| 2022/0209892 A1* | 6/2022 | Hall | H03M 13/2909 |
| 2023/0397244 A1* | 12/2023 | Szymanik | H04W 72/569 |
| 2023/0403746 A1* | 12/2023 | Yang | H04B 7/0695 |
| 2024/0147224 A1* | 5/2024 | Jungerman | H04W 88/16 |
| 2025/0081168 A1* | 3/2025 | Barbu | H04W 72/231 |
| 2025/0098634 A1* | 3/2025 | Russek-Sobol | A01K 29/005 |
| 2025/0253958 A1* | 8/2025 | Soloff | H04B 11/00 |
| 2025/0373888 A1* | 12/2025 | Wang | H04N 21/43615 |

* cited by examiner

LoRa frame

Preamble
701

LoRa preamble

LoRa Monitoring station

LoRa DOS Station

Packet(s) as received by LoRa Device

Packet(s) as received by LoRa Monitoring station

1700

From FIG. 16 step 1605 → DOS action A selected 1701

Set LMAB system to blocking mode 1702

LoRa DOS station receives LoRa preambles 1703

LoRa DOS station transmits blocking signal and disconnects input to LoRa monitoring station 1708

LoRa monitoring station demodulates packet 1710

Sends packet details to GP computer 1711

1712 Change DOS action ?

NO

YES

To FIG. 16 step 1604

FIG. 18

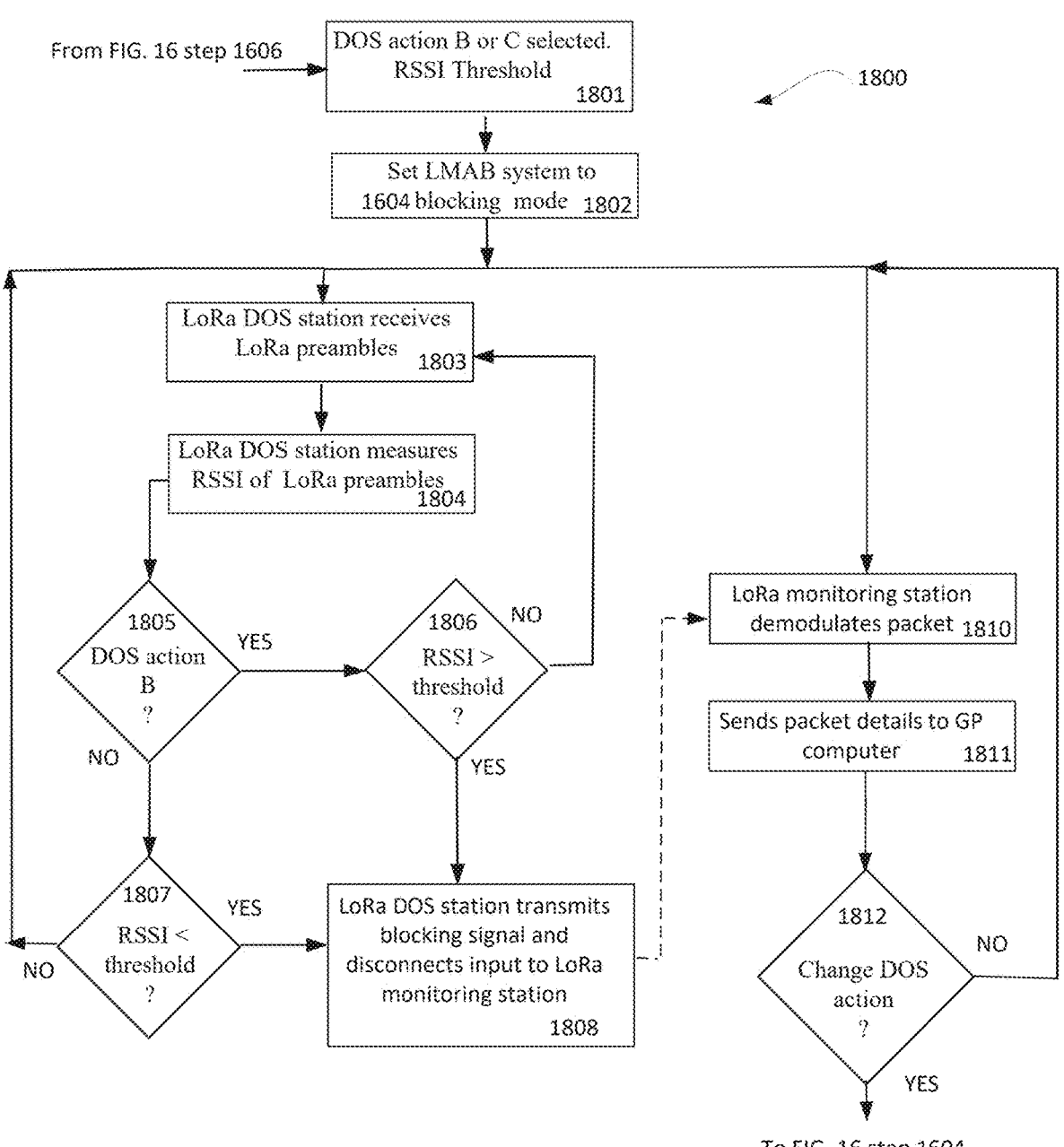

From FIG. 16 step 1606

DOS action B or C selected.
RSSI Threshold          1801

1800

Set LMAB system to
1604 blocking mode    1802

LoRa DOS station receives
LoRa preambles        1803

LoRa DOS station measures
RSSI of LoRa preambles
1804

1805
DOS action
B
?

YES

1806
RSSI >
threshold
?

NO

NO

YES

LoRa monitoring station
demodulates packet  1810

Sends packet details to GP
computer          1811

1807
RSSI <
threshold
?

YES

NO

LoRa DOS station transmits
blocking signal and
disconnects input to LoRa
monitoring station
1808

1812
Change DOS
action
?

NO

YES

To FIG. 16 step 1604

SYSTEM AND METHOD FOR BLOCKING OF LOW POWER WIDE AREA NETWORKS

CROSS-REFERENCE TO RELATED APPLICATIONS

This application claims priority to U.S. Provisional Application No. 63/741,761, filed on Jan. 3, 2025 and titled "SYSTEM AND METHOD FOR BLOCKING OF LOW POWER WIDE AREA NETWORKS," the entire disclosure of which is hereby incorporated by reference.

TECHNICAL FIELD

The present disclosure relates to wireless communications and in particular to a method and monitoring station for identifying and interrupting packets being communicated in a low power wide area network (LPWAN).

BACKGROUND

LoRa (Long-Range) is a proprietary Chirp Spread Spectrum (CSS)-based radio frequency modulation technique utilized in low power wide area networks (LPWANs). The LoRaWAN protocol is designed to wirelessly connect battery-operated devices to the internet using LoRa modulation, enabling communication links of up to 10 miles or more in rural areas. LoRa operates in fixed bandwidth channels of 125 kilohertz (kHz), 250 kHz, or 500 kHz, depending on regional frequency plans, and employs orthogonal spreading factors ranging from SF7 to SF12. The modulation technique utilizes chirp signals—sinusoidal signals whose frequency varies linearly with time—wherein LoRa embeds information data in the starting frequency of an upchirp. A typical LoRa frame consists of three main components: a preamble for detection and synchronization, a header containing control information, and a payload with encoded data symbols.

In a LoRaWAN network implementation, end devices communicate with gateways that forward data packets to a LoRa-enabled network server via secure internet protocol backbones. The network architecture includes end devices, gateways, network servers, join servers, application servers, and data portals. Generally, there is no fixed association between an end device and a gateway, and uplink packets sent by an end device may be received by multiple gateways in the area. Gateways operate at the physical layer, checking data integrity and forwarding messages to the network server together with metadata such as received signal strength. In certain circumstances, it may be desirable to interrupt communications between LoRa gateways and LoRa end devices through denial of service (DOS) actions, which may constitute legally approved interventions rather than nefarious activities.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

In various examples, the subject matter described herein relates to systems and methods for monitoring and selectively blocking communications in low power wide area networks (LPWANs) utilizing LoRa modulation. In particular, systems and methods are provided for detecting LoRa preambles, identifying target LoRa devices based on signal attributes, transmitting blocking signals to interrupt packet reception at intended recipients, while simultaneously maintaining the ability to monitor and demodulate the blocked packets for analysis and selective denial of service operations. According to some embodiments, a method for monitoring and blocking data packets while maintaining the ability to demodulate blocked data packets includes receiving, at a receiver, a first data packet and analyzing a first portion of the first data packet to determine one or more attributes of the first data packet. A blocking signal is transmitted based on the one or more attributes of the first data packet. Receipt of the first data packet is discontinued at the receiver during transmission of the blocking signal and receipt of a remainder of the first data packet is continued at the receiver following transmission of the blocking signal. Data included in the remainder of the first data packet is demodulated at the receiver.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure (FIG. 1 is a graph of frequency versus time for an example unmodulated upchirp, in accordance with some embodiments.

FIG. 18 is a flowchart of an exemplary process for second and third DOS actions, in accordance with some embodiments.

Figure 1:
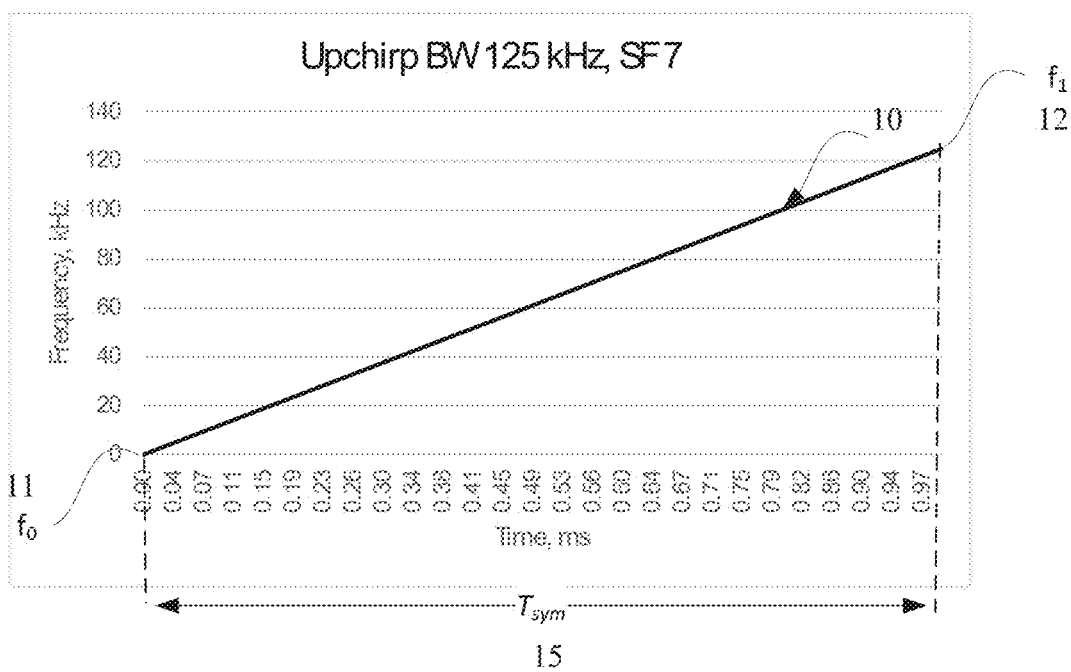

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

As described above, "LoRa" (Long-Range) is a Chirp Spread Spectrum (CSS)-based radio frequency (RF) modulation technique that is used in low power wide area networks (LPWANs). The name "LoRa" is derived from "long range" and communication links using LoRa can be up to 10 miles or more in rural areas. The LoRaWAN® Specification v1.0.4, 2020, is an LPWAN protocol designed to wirelessly connect battery operated devices to the internet using LoRa modulation. LoRa operates in fixed bandwidth channels of either 125 kilohertz (kHz), 250 kHz, or 500 kHz (dependent on the region/frequency plan) and uses a number of orthogonal spreading factors (SFs). LoRa modulation is also known as CSS modulation and generally uses up to six SFs, (i.e., SF7 to SF12). A chirp is a sinusoidal signal whose frequency varies linearly with time. Generally, chirp modulation is a technique in which the slope of the chirp is the information bearing element; a positive slope (i.e., an upchirp) may represent a binary one, and a negative slope (i.e., a downchirp) may represent a binary zero. LoRa, however, embeds the information data in the starting frequency of an upchirp.

LoRa devices can operate as either a fixed channel transmitter or as a frequency hopping transmitter using a pseudo-random channel hopping method. Generally, ten channels are defined for use in Europe, and sixty-four, 125 kHz channels are defined for use in North America. In the United States, LoRa systems generally use frequency hopping.

To better understand the present disclosure, and the attendant advantages and features thereof, the basics of LoRa modulation are described.

The number of data symbols, M, is related to the spreading factor SF as provided by equation (1).

$$M=2^{SF} \tag{1}$$

In equation (1), $SF \in \{7, 8, 9, 10, 11, 12\}$. Hence, each data symbol, M, has SF bits.

The symbol time $T_{sym}$ is defined as provided by equation (2).

$$T_{sym}=M/B \tag{2}$$

In equation (2), B is the chirp bandwidth, $B \in \{125, 250, 500\}$ kHz.

The chirp rate $R_{ch}$, kHz/sec, is provided by equation (3).

$$R_{ch} = \frac{B}{T_{sym}}. \tag{3}$$

The raw bit rate $R_b$ is provided by equation (4).

$$R_b = \frac{\text{bits/symbol}}{T_{sym}} = \frac{SF}{T_{sym}}. \tag{4}$$

For example, for SF=7 and B=125 kHz:
M=128, $T_{sym}$=1.024 ms, $R_{ch}$=125 kHz/ms, $R_b$=6.8 kb/s, and for SF=8 and B=125 kHz:
M=256, $T_{sym}$=2.048 ms, $R_{ch}$=125 kHz/ms, $R_b$=3.9 kb/s.

FIG. 1 is a graph of an example of frequency versus time for an unmodulated upchirp with B=125 kHz, and SF=7. At time zero the chirp frequency is $f_0$ 11, and at time $T_{sym}$ (1.024 ms) the chirp frequency is $f_1$ 12 where $f_1-f_0$=B=125 kHz. The instantaneous chirp frequency, $F_t$, at time t is provided by equation (5).

$$F_t = f_0 + R_{ch}t = f_0 + \frac{B}{T_{sym}}t \quad 0 \le t \le T_{sym} \tag{5}$$

Figure 2:
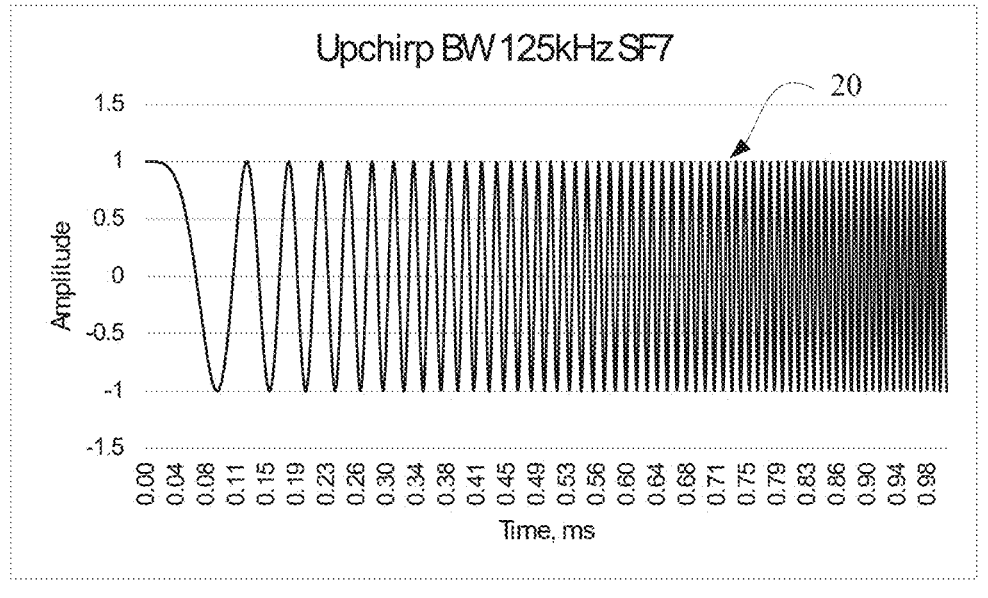
FIG. 2 is a graph of amplitude versus time for the example unmodulated upchirp shown in FIG. 1 that shows the increasing chirp frequency with time, in accordance with some embodiments.

FIG. 2 is a graph of amplitude versus time for the unmodulated upchirp example shown in FIG. 1 and shows the chirp frequency 20 increasing with time.

Figure 3:
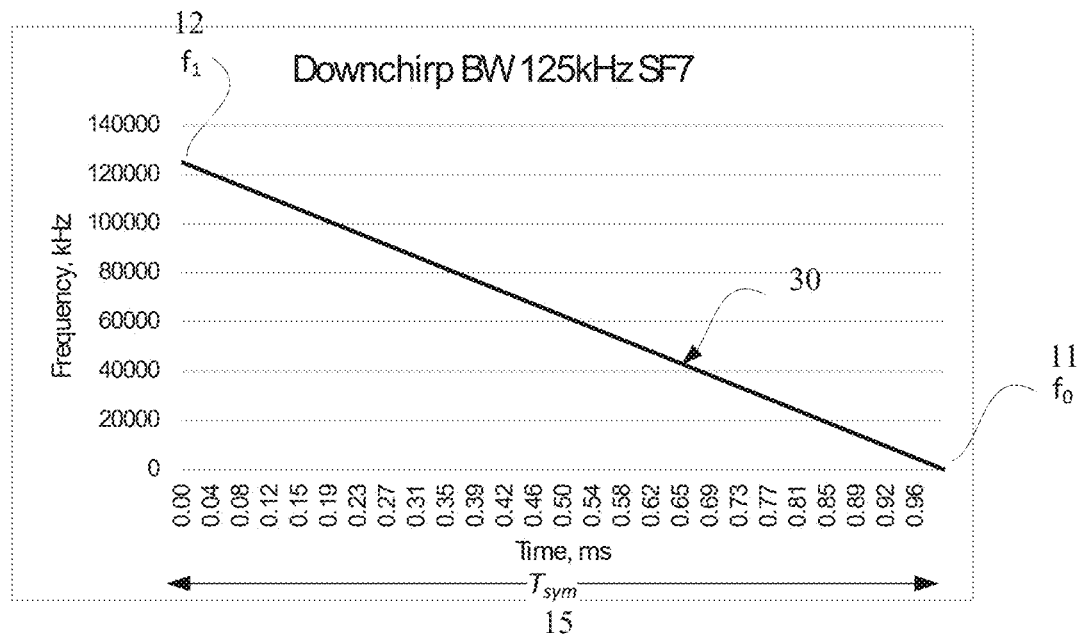
FIG. 3 is a graph of frequency versus time for an example unmodulated downchirp, in accordance with some embodiments.
Figure 4:
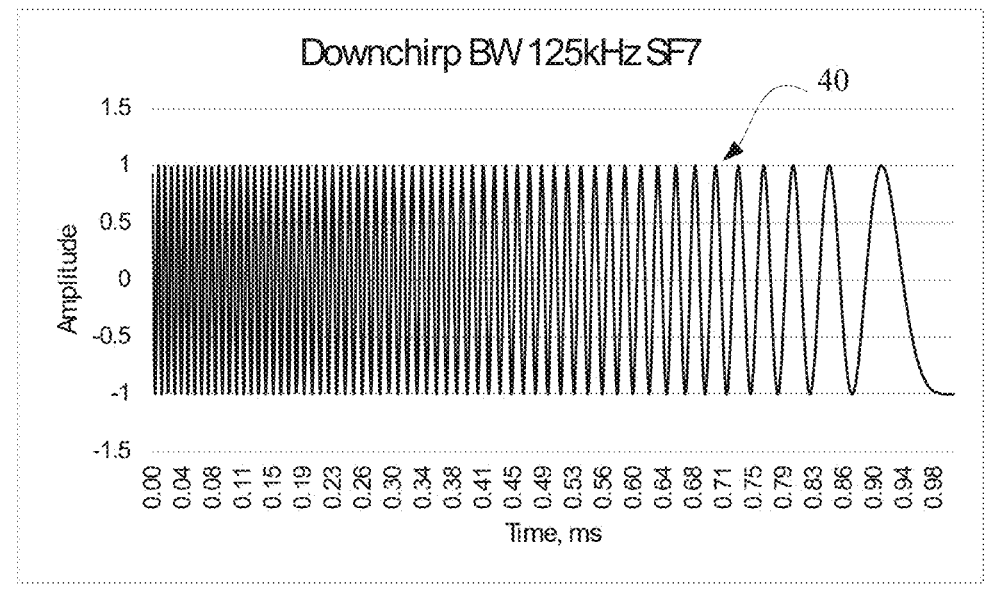
FIG. 4 is a graph of amplitude versus time for the example unmodulated downchirp shown in FIG. 3 that shows the decreasing chirp frequency with time, in accordance with some embodiments.

FIG. 3 is a graph of an example of frequency versus time for an unmodulated downchirp with B=125 kHz, and SF=7. In this example, at time zero the chirp frequency is $f_1$ 12, and at time $T_{sym}$ 15 ($T_{sym}$=1.024 ms), the chirp frequency is $f_0$ 11. FIG. 4 is a graph of amplitude versus time for the example unmodulated downchirp shown in FIG. 3, that shows the decreasing chirp frequency 40 with time.

An unmodulated upchirp symbol, $s_{up}(t)$, can be provided by equation (6).

$$s_{up}(t) = e^{j2\pi\left(f_0+\frac{Bt}{2T_{sym}}\right)t}. \tag{6}$$

An unmodulated downchirp symbol, $s_{down}(t)$, can be provided by equation (7).

$$s_{down}(t) = e^{j2\pi\left(f_1+\frac{Bt}{2T_{sym}}\right)t}. \tag{7}$$

For a modulated upchirp, the starting frequency $f_s$ defines the data symbol. For a modulated upchirp of M data symbols, the starting frequency $f_s$ corresponds to symbol m, where $m \in \{0, 1, 2 \ldots M-1\}$.

The chirp starting frequency $f_s$ is provided by equation (8).

$$f_s = f_0 + \frac{m}{M}B = f_0 + f_m. \tag{8}$$

In equation $$f_m = \frac{m}{M}B. \tag{8}$$

A modulated upchirp symbol, $s_{up}(t)_{mod}$, can then be provided by equation (9).

$$s_{up}(t)_{mod} = e^{j2\pi\left(f_s + \frac{Bt}{2T_{sym}}\right)t} \text{ for } 0 \le t \le \frac{(M-m)}{M}T_{sym} \tag{9}$$
$$= e^{j2\pi\left(f_s + \frac{Bt}{2T_{sym}}\right)t} \text{ for } \frac{(M-m)}{M}T_{sym} < t \le T_{sym}$$

Figure 5:
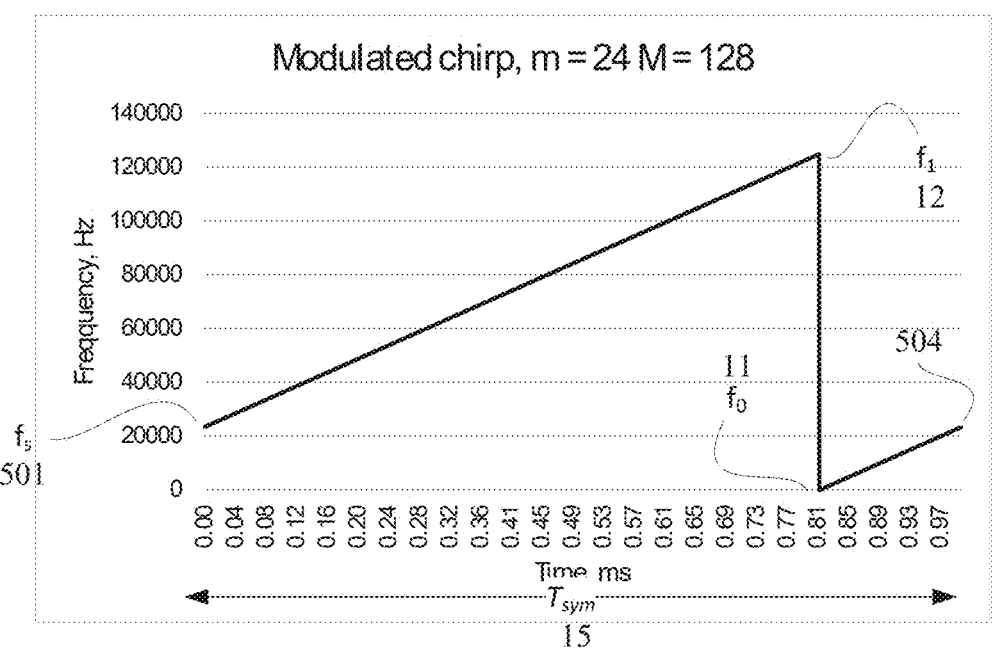
FIG. 5 is a graph of frequency versus time for an example modulated upchirp, in accordance with some embodiments.

FIG. 5 is a graph of an example of frequency versus time for a modulated upchirp with B=125 kHz, SF=7, and m=24. The starting frequency, from equation (8), $f_s$ 501, is $f_s = f_0 + 23.4375$ kHz. The frequency linearly increases to $f_1$ 12 at time $$t = \frac{(M-m)}{M}T_{sym}.$$

Figure 6:
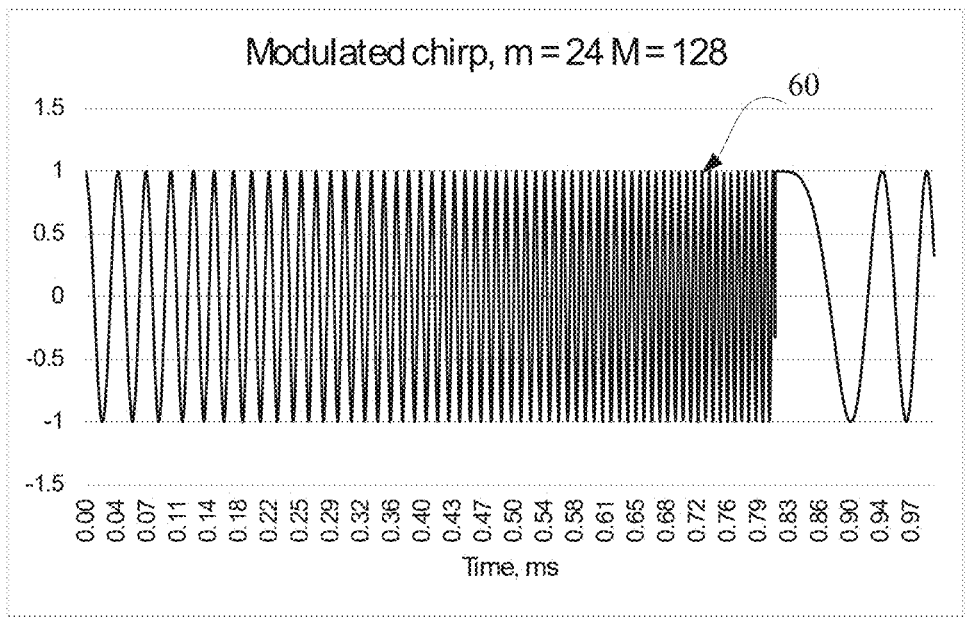
FIG. 6 is a graph of amplitude versus time for the example modulated upchirp shown in FIG. 5, in accordance with some embodiments.

The frequency then returns to $f_0$ 11, and again increases linearly until time $t=T_{sym}$ (i.e., 1.024 ms) 15 (section 504). FIG. 6 is a graph of amplitude versus time for the example modulated upchirp 60 shown in FIG. 5. The frequency spacing $\Delta f$ between symbols is B/M. Hence if B=125 kHz and M=128, $\Delta f$=976 Hz.

The basic function of de-chirping is performed by multiplying a received upchirp with a locally generated downchirp. Ignoring any amplitude, phase, time and frequency differences, a de-chirped unmodulated upchirp symbol $s_{dc}(t)$ can be provided by equation (10):

$$s_{dc}(t) = e^{j2\pi\left(f_0 + \frac{Bt}{2T_{sym}}\right)t}e^{j2\pi\left(f_1 - \frac{Bt}{2T_{sym}}\right)t} \tag{10}$$
$$= e^{j2\pi(f_0+f_1)t}$$

From equation (10), the de-chirped signal $s_{dc}(t)$ has a fixed frequency ($f_0+f_1$) which may be determined by performing a digital Fourier transform (DFT) on the de-chirped signal.

Figure 7:
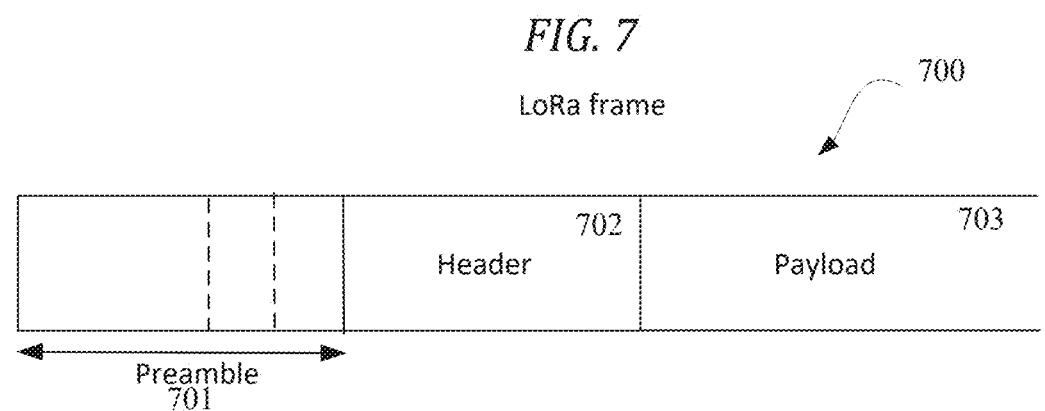
FIG. 7 is a diagram of a format for an exemplary LoRa frame, in accordance with some embodiments.

FIG. 7 is an example of the format 700 of a LoRa frame. A LoRa frame consists of three main parts; (i) the preamble 701, (ii) the header 702, and (iii) the payload 703. The preamble 701 is used for the detection of a LoRa frame 700 and for time-frequency synchronization. The header 702 generally includes 8 LoRa data symbols encoded with Hamming code (4,8) and contains the control information (e.g., payload length N, and channel coding rate). The payload 703 contains a number of LoRa data symbols with the data encoded with Hamming code (4, $n_H$), where $n_H \in \{5, 6, 7, 8\}$.

Figure 8:
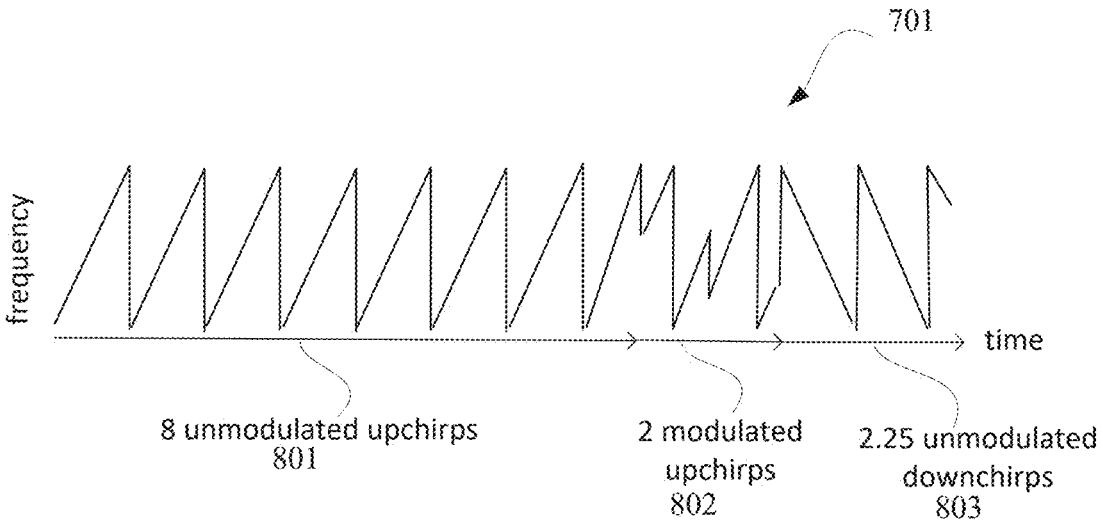
FIG. 8 is a frequency versus time graphical example of a LoRa preamble, in accordance with some embodiments.

FIG. 8 is a frequency versus time graphical example of the LoRa preamble 701. The preamble 701 begins with K unmodulated upchirps 801 at a chirp rate $$R_{ch} = \frac{B}{T_{sym}}.$$

The minimum value for K is 6 and the maximum 65535, but generally K is set to eight as shown in FIG. 8. The eight unmodulated upchirps 801 are followed by two modulated upchirp data symbols 802. The two data symbols 802 have a predetermined modulation and is known as the sync word. The sync word 802 is generally used as an identification code for the network. If the received sync word 802 does not match the network code, then the complete LoRa frame 700 may be rejected. The preamble 701 ends with unmodulated downchirps that continue for 2.25 symbol times (i.e., $2.25 \cdot T_{sym}$). This preamble structure assists in detecting the presence of a LoRa signal as well as frame, frequency and timing synchronization.

Figure 9:
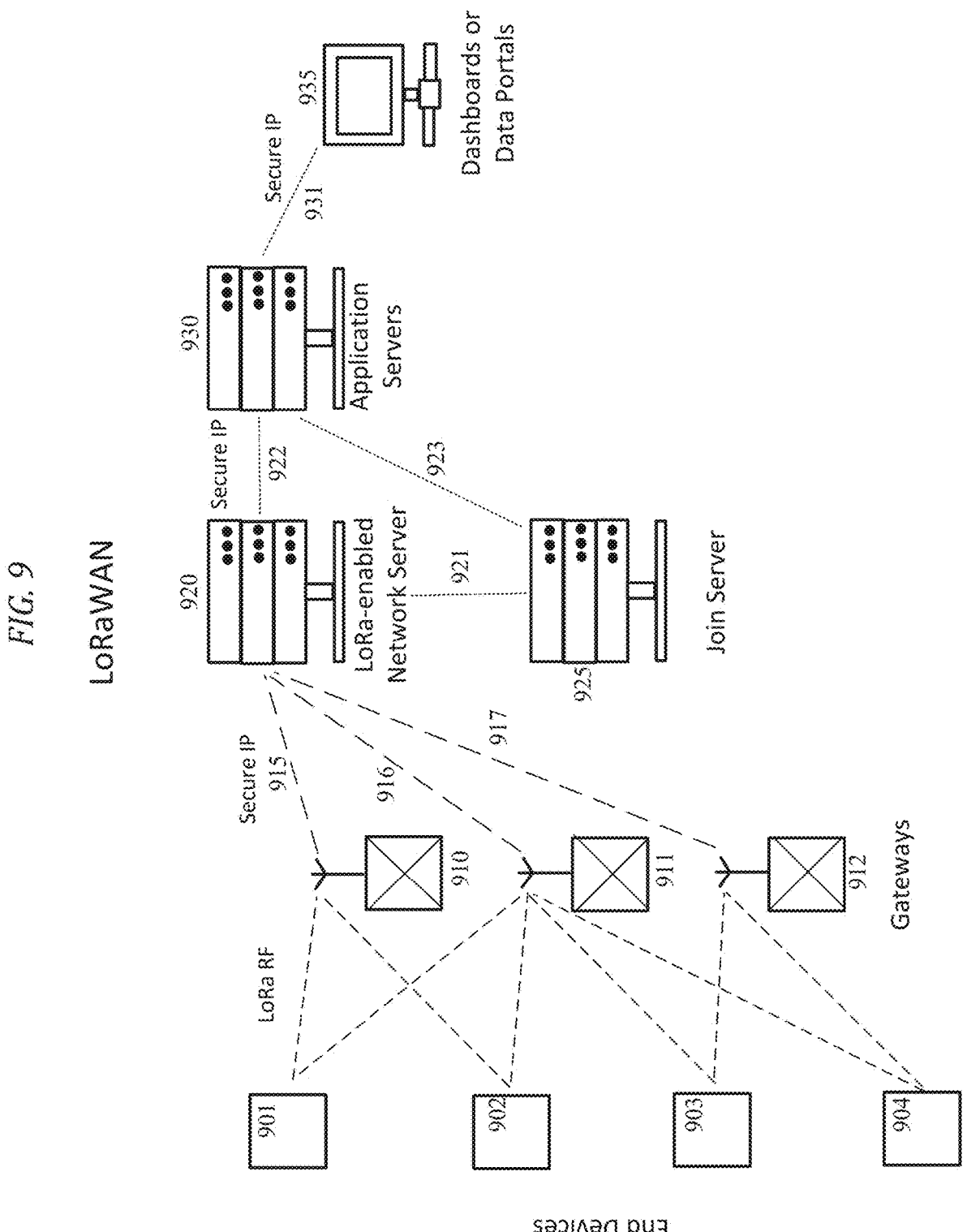
FIG. 9 is a block schematic diagram of an example end-to-end LoRaWAN network implementation, in accordance with some embodiments.

FIG. 9 is a block schematic diagram of an example of an end-to-end LoRaWAN network implementation. A network may include (i) a number of end devices (e.g., 901, 902, 903 and 904), (ii) a number of gateways (e.g., 910, 911 and 912), (iii) a LoRa-enabled network server (LNS) 920, (iv) a join server 925, (v) application servers 930, and (vi) dashboard or data portals 935.

Generally, end devices, 901 to 904, are autonomous sensors that digitize physical conditions and environmental events such as street lighting, wireless locks, water valve shut off, leak prevention, among others. LoRa-based devices are assigned several unique identifiers on manufacture. A number of LoRaWAN gateways, 910 to 912, may receive LoRa modulated RF packets from any end device, 901 to 904, within range. The LoRaWAN gateway, 910 to 912 forwards received data packets to the LoRaWAN network server 920 via secure internet protocol (IP) backbones 915, 916, 917 respectively. The secure IP backbone may be, for example, a Wi-Fi, Ethernet or Cellular connection. Generally, there is no fixed association between an end device 901 to 904 and a gateway 910 to 912, and an end device can be served by multiple gateways in the area. In other words, each uplink packet sent by an end device may be received by multiple gateways. Gateways operate entirely at the physical layer; they check the data integrity of each received data message, and if correct, forward the data message to the LNS 920 together with meta data such as received signal strength (RSSI) and time. For LoRaWAN downlink traffic, a gateway 910 to 912 simply executes transmission requests received from the LNS 920. The LNS 920 manages the entire network, ensures the authenticity of every end device on the network and checks the integrity of every message.

Application servers 930 may be connected to the LNS 920 and to the join server 925 via secure IP backbones 922 and 923 respectively, and are responsible for securely handling, managing and interpreting sensor application data. They also generate all the application-layer downlink payloads to the end devices. Dashboards or data portals 935 may be connected to the application servers 930 via IP secure backbone 935. The join server 925 may be connected to LNS 920 via secure IP backbone 921 and manages the over-the-air activation process for end devices to be added to the network.

In certain circumstances, it may be desired to interrupt communications between LoRa gateways and LoRa end devices. Such interruption of communication is known as "denial of service" (DOS). It is noted that not all DOS actions are nefarious. For example, a DOS action may be a legally approved action.

Accordingly, apparatuses and methods are disclosed herein for precision blocking (i.e., denial of service (DOS)) of LoRa gateways, end devices, and LoRaWAN networks. To better understand the present disclosure and the attendant advantages and features therein, the basis of the disclosed denial of service (DOS) method, "preamble attack", is first described.

Figure 10:
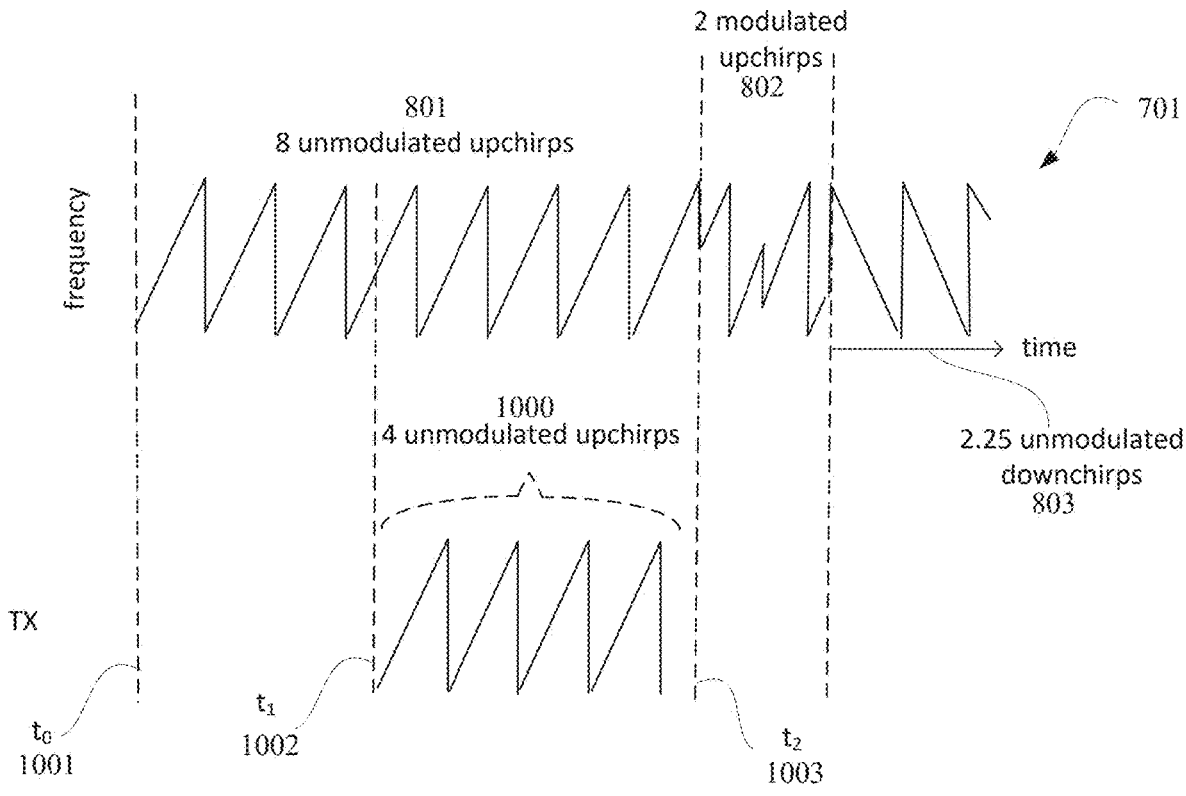
FIG. 10 is a graphical example of a timing of a set of unmodulated upchirps used to block a preamble transmission from a target LoRa device, in accordance with some embodiments.

FIG. 10 is a graphical example of the timing of a set of unmodulated upchirps, the blocking signal 1000, that may be used to block a preamble transmission 701 from a target LoRa device, such as LoRa gateway 910 or LoRa end device 901. At time to 1001, the start of the unmodulated upchirps 801 of a preamble 701 from a LoRa device is detected. At time $t_1$ 1002, a blocking signal 1000 that includes several unmodulated upchirps, may be transmitted. The blocking signal 1000 terminates before time $t_2$ 1003 when the 2 modulated upchirps 802 (i.e., the sync word 802) of the preamble 701 start. The blocking signal 1000 consists of a limited number of unmodulated upchirps.

Generally, preambles 701 begin with 8 unmodulated upchirps. The 8 upchirps 801 of the preamble are used by receiving stations to synchronize to the timing of the received packet. Generally, a LoRa device can synchronize to the preamble 701 after just 3 upchirps. Hence, in the example shown in FIG. 10, it may be assumed that the receiving LoRa device has synchronized to the received preamble just before time $t_1$ 1002. At time $t_1$ 1002, which is approximately 3.5 upchirps of the received preamble, the blocking signal 1000 is transmitted. The 0.5 upchirp delay allows the receiving device to measure the SF and bandwidth B of the received upchirps, and then set up the parameters of the blocking signal 1000 before transmission. The blocking signal 1000 includes a set of upchirps at the same basic spreading factor SF and bandwidth B as the received unmodulated upchirps 801 of the received preamble 701. The synchronization parameters (e.g., time base, exact start and stop frequencies, $f_0$ 11 and $f_1$ 12, and symbol time $T_{sym}$ 15) of the blocking signal 1000, however, will differ to those of the received upchirps 801. Generally, as long as there are 3 or more upchirps transmitted in the blocking signal 1000, then the intended LoRa receiving device will re-synchronize to the timing of the blocking signal 1000. The result is that the rest of the packet is not correctly demodulated by the LoRa receiver and the packet fails. If the sync word 802 is not received correctly, then the packet will also fail. In order to maintain the ability to monitor and decode blocked packets, the sync word 802 must be received intact; hence, the blocking signal 1000 generally includes 4 unmodulated upchirps starting at time $t_1$ 1002 and ending before time $t_2$ 1003 so as not to transmit over the sync word 802.

Generally, if the blocking signals 1000 are received at a LoRa device (e.g., LoRa gateway 910 or LoRa end device 901) at a signal level between 4 to 9 dB greater than the intended receiving preamble signal, then the receiving device will re-synchronize to the blocking signal 1000 causing the received packet to fail. Because the preamble is common for all LoRa devices (i.e., gateways 910 and end devices 901), this preamble attack may be used against all LoRa devices.

Figure 11:
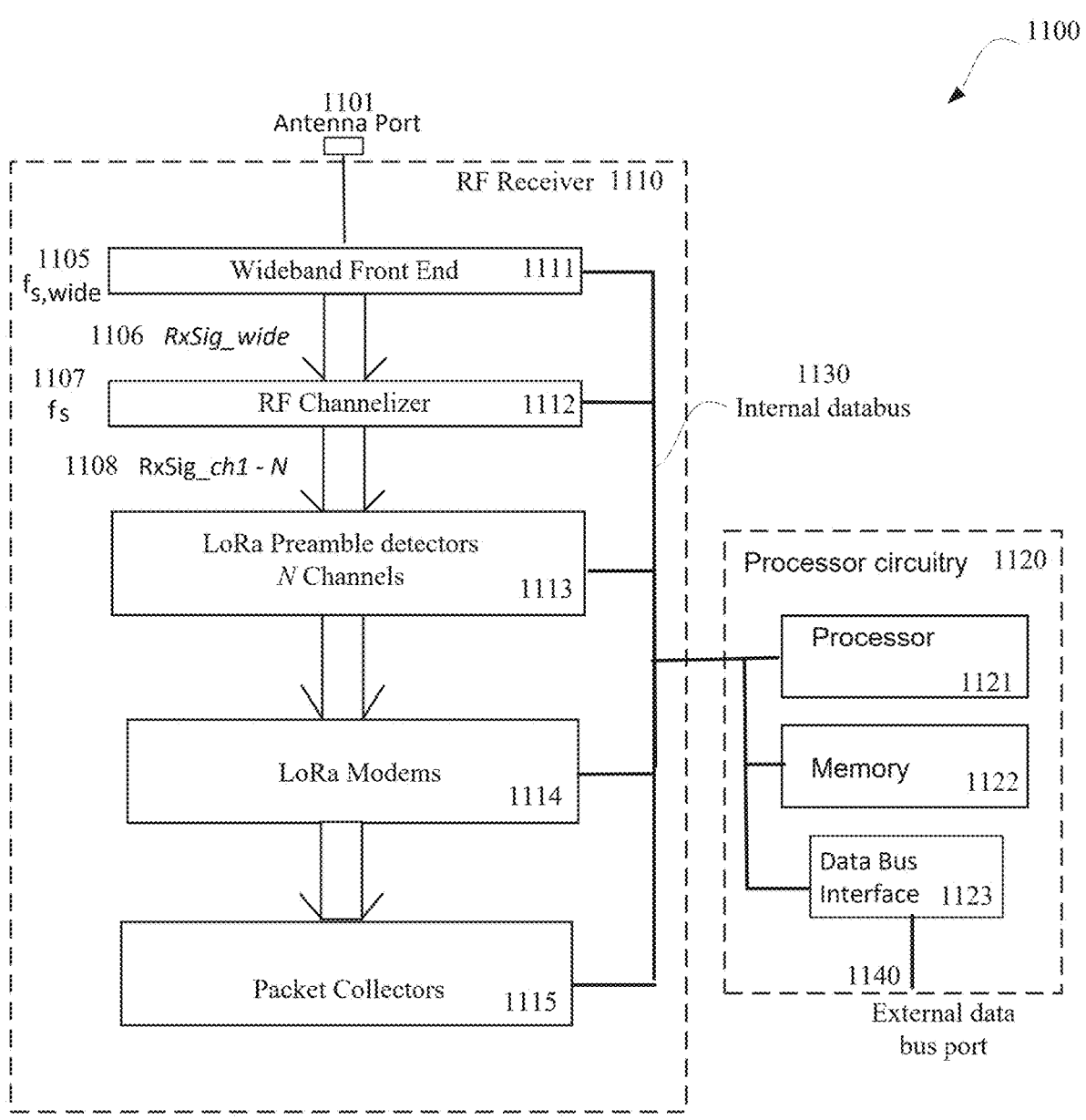
FIG. 11 is a block diagram of an exemplary LoRa monitoring station, in accordance with some embodiments.

FIG. 11 is a block diagram of an example of a LoRa monitoring station 1100 that can be used to monitor LoRa signals across all channels. In some embodiments, LoRa monitoring station 1100 includes an antenna port 1101, a radio frequency (RF) receiver 1110, processing circuitry 1120 and an internal data bus 1130.

In some embodiments, the RF receiver 1110 includes a wideband front end 1111, an RF channelizer 1112, LoRa preamble detectors 1113, LoRa modems 1114, and packet collectors 1115. The wideband front end 1111 may perform functions such as low noise amplification, filtering, and frequency down conversion to condition signals received from antenna port 1101 for inputting to the RF channelizer 1112. The output from the wideband front end 1111 can include a number of sampled, complex, wideband signals, RxSig_wide 1106, at a sample frequency $f_{s,wide}$ 1105, that are passed to the RF channelizer 1112, which divides the wide band signal(s) into a number N sampled signals/channels (i.e., RxSig_ch1-N, 1108) at sample rate $f_s$ 1107, where $f_s \ll f_{s,wide}$. RF channelizer 1112 may output up to N signals to a bank of N LoRa preamble detectors 1113. If a LoRa preamble 701 is detected by any of the N preamble detectors, then that signal is sent to an available LoRa modem in the bank of LoRa modems 1114, together with the channel number. The signal may be delayed such that the selected LoRa modem receives the complete LoRa preamble and packet. The number n of individual modems in the bank of LoRa modems 1114 may be less than N as signals are generally not present at the same time on every channel. The number N may also vary with the number of channels in use at the geographic location of the LoRaWAN. LoRa modems 1114 may demodulate the signals received from the LoRa preamble detectors 1113 and output the packet to the packet collectors 1115 where individual packets may be decoded and stored.

In some embodiments, processing circuitry 1120 includes a processor 1121, a memory module 1122, data bus interface 1123, and an external data bus port 1140. In some embodiments, the processing circuitry 1120 and/or the processor 1121 may include integrated circuitry (not shown) for processing and/or control, for example, one or more processors, and/or processor cores, and/or Field Programmable Gate Arrays (FPGAs), and/or Application Specific Integrated Circuitry (ASICs), configured to execute programmatic software instructions. In some embodiments, some or all of the functions of the RF receiver 1110 may be performed by the processing circuitry 1120. The processing circuitry 1120 may be configured to control any of the methods and/or processes described herein and/or to cause such methods and/or processes to be performed, e.g., by the RF receiver 1110. The memory module 1122 may be configured to store data, programmatic software code and/or other information described herein. In some embodiments, the software may include instructions that, when executed by the processing circuitry 1120, cause the processing circuitry 1120 to perform the processes described herein with respect to the LoRa monitoring station 1100 in identifying and demodulating LoRa packets and storing them for analysis. The data bus interface 1123 may be used to interface to an external data bus (e.g., Ethernet or universal serial bus (USB)) via the external data bus port 1140.

In some embodiments, the LoRa monitoring station 1100 may be configured to simultaneously receive the transmissions of other LoRa devices, for example, LoRa gateways 910 or LoRa end devices 901, across the entire frequency band, and to record, in the packet collectors 1115, the contents and attributes of those transmissions. The contents and attributes of received packets may be outputted via the data bus interface 1123 and the external data bus port 1140, to an external processor or computer that may, for example, be running a network analyzer. The LoRa monitoring station 1100 may also be configured to detect the preamble of one or more target LoRa devices, for example one or more LoRa gateways 910, and accurately measure preamble attributes. By way of example and not limitation, such attributes may include signal strength, bandwidth (upchirp start and stop frequencies), spreading factor SF, symbol time, instantaneous carrier frequency offset (CFO), in-phase and quadrature (IQ) offsets, phase error, power amplifier nonlinearity, spectrum, and time-frequency statistics. Selections of these attributes may be used as fingerprints for those target LoRa devices. These measurements may be performed by the LoRa preamble detectors 1113 under control of the processing circuitry 1120, the results being stored in the memory 1122 and made available to external devices via the data bus interface 1123.

Figure 12:
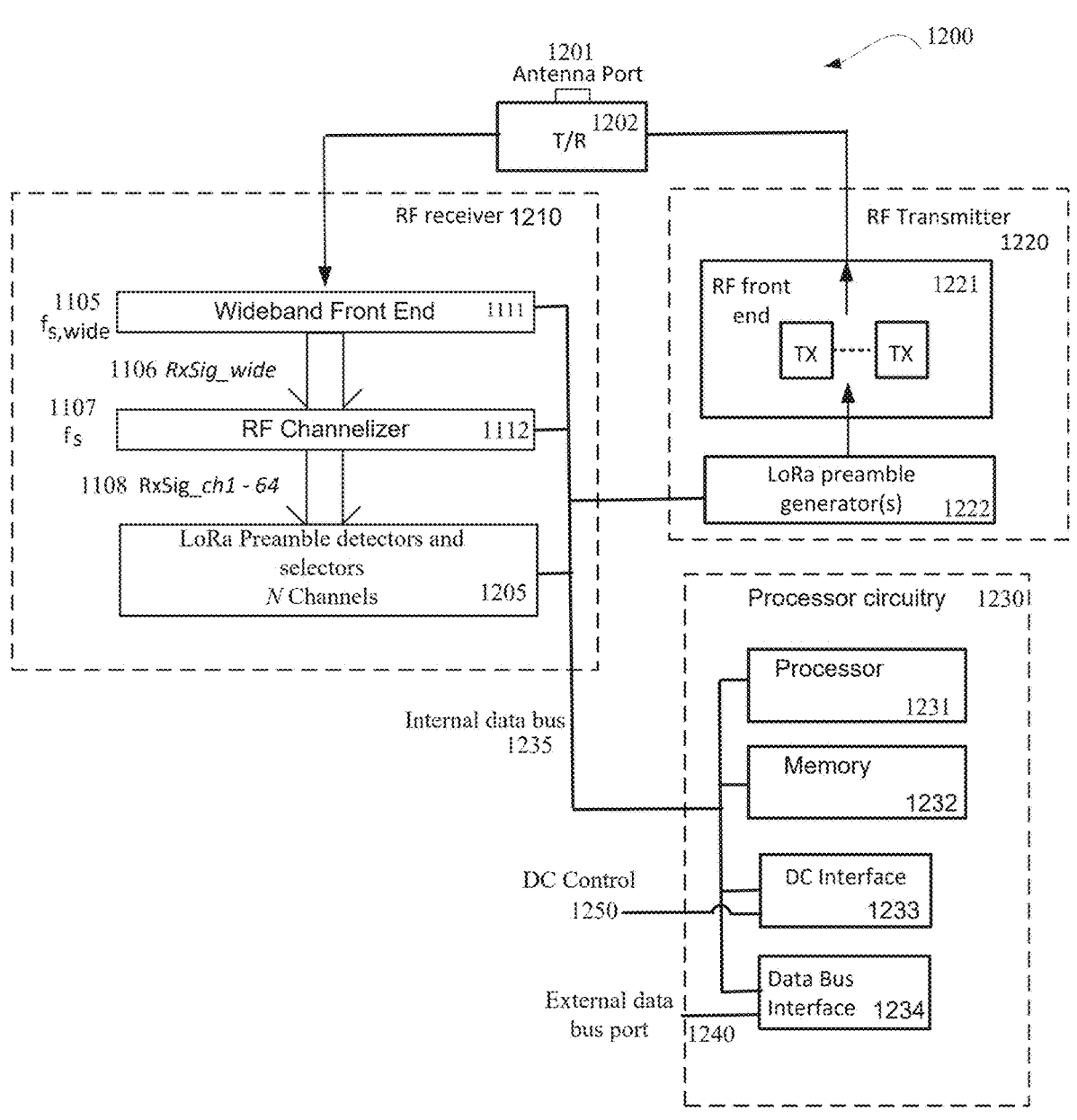
FIG. 12 is a block diagram of an exemplary LoRa Denial of Service (DOS) station, in accordance with some embodiments.

FIG. 12 is a block diagram of an example of a LoRa DOS station 1200 that can be used to detect LoRa preambles across all channels of the frequency band and selectively transmit blocking signal(s) 1000 as discussed above with reference to FIG. 10. In some embodiments, the LoRa DOS station 1200 includes an antenna port 1201, a transmit/receive (T/R) selector 1202, an RF receiver 1210, RF transmitter 1220, processing circuitry 1230, and internal data bus 1235.

In some embodiments, RF receiver 1210 includes a wideband front end 1111, an RF channelizer 1112, and a bank of N LoRa preamble detectors and selectors 1205. The wideband front end 1111 (as also used in the LoRa monitoring station 1100) may perform functions such as low noise amplification, filtering, and frequency down conversion to condition signals received from the antenna port 1201 for inputting to the RF channelizer 1112. Similar to the LoRa monitoring station 1100, the output from the wideband front end 1111 can include a number of sampled, complex, wideband signals, RxSig_wide 1106, at a sample frequency $f_{s,wide}$ 1105 that are passed to the RF channelizer 1112, which divides the wide band signal(s) into a number N sampled signals/channels (i.e., RxSig_ch1-N, 1108) at sample rate $f_s$ 1107, where $f_s \ll f_{s,wide}$. The RF channelizer 1112 may output up to N signals to a bank of N LoRa preamble detectors and selectors 1205. In some embodiments, the bank of N LoRa preamble detectors and selectors 1205 detect the start of LoRa preambles, determine the spreading factor and bandwidth and pass this information to the LoRa preamble generator(s) 1222. The LoRa preamble generator(s) 1222 may then prepare the blocking signal 1000 upchirps with the same SF and bandwidth as the received preamble, for transmission after about 3.5 upchirps of the received preamble, via the RF front end 1231, the T/R switch 1202 and the antenna port 1201. The preamble detectors and selectors 1205 may also, under control of the processing circuitry 1230, accurately measure the attributes of the received preamble such as signal strength, bandwidth (upchirp start and stop frequencies), spreading factor SF, symbol time, instantaneous carrier frequency offset (CFO), in-phase and quadrature (IQ) offsets, phase error, power amplifier nonlinearity, spectrum, and time-frequency statistics. The preamble attributes may be stored together with the details of the packet including the device address(es) if known.

In some embodiments, the RF Transmitter 1220 may include the RF front end 1221 and the LoRa preamble generators 1222. The RF front end 1221 may perform the functions of up conversion and amplification for the simultaneous transmissions of a number of preamble packets via antenna port 1201. The RF front end 1220 may include any number of transmitters to support simultaneous transmissions on one or more channels. The LoRa preamble generators 1222 may perform the functions of generating a number of unmodulated upchirps and may include any number of LoRa preamble generators to support transmissions on several channels.

In some embodiments, the processing circuitry 1230 includes the processor 1231, the memory module 1232, the direct current (DC) interface 1233, and the data bus interface 1234. In some embodiments, the processing circuitry 1230 and/or the processor 1231 may include integrated circuitry (not shown) for processing and/or control, for example, one or more processors, and/or processor cores, and/or FPGAs, and/or ASICs, configured to execute programmatic software instructions. In some embodiments, some or all of the functions of the RF receiver 1210 may be performed by the processing circuitry 1230. The processing circuitry 1230 may be configured to control any of the methods and/or processes described herein and/or to cause such methods and/or processes to be performed, e.g., by the RF receiver 1210. The memory module 1232 may be configured to store data, programmatic software code and/or other information described herein. In some embodiments, the software may include instructions that, when executed by the processing circuitry 1230, cause the processing circuitry 1230 to perform the processes described herein with respect to the LoRa DOS station 1200 in identifying and selecting LoRa preambles, generating unmodulated upchirp signals, and transmitting them.

The data bus interface 1234 may be used to interface to an external data bus via an external data bus port 1240, for example Ethernet or USB. The DC interface 1233 may be used to output a control signal to another device as controlled by the processor 1231.

In some embodiments, the LoRa DOS station 1200, may be configured to (i) receive preamble transmissions, (ii) identify the spreading factor (SF) and bandwidth (B) of the initial upchirps of the preamble, (iii) measure attributes of the received preamble, (iv) identify the preamble as being transmitted by a target LoRa device (e.g., packets to and from a target LoRa gateway 910 or LoRa end device 901), and (v) transmit a blocking signal 1000. In some embodiments, the LoRa DOS station 1200 may be configured to output a control signal via the DC control 1250 that coincides with a preamble blocking signal 1000 being transmitted.

Figure 13:
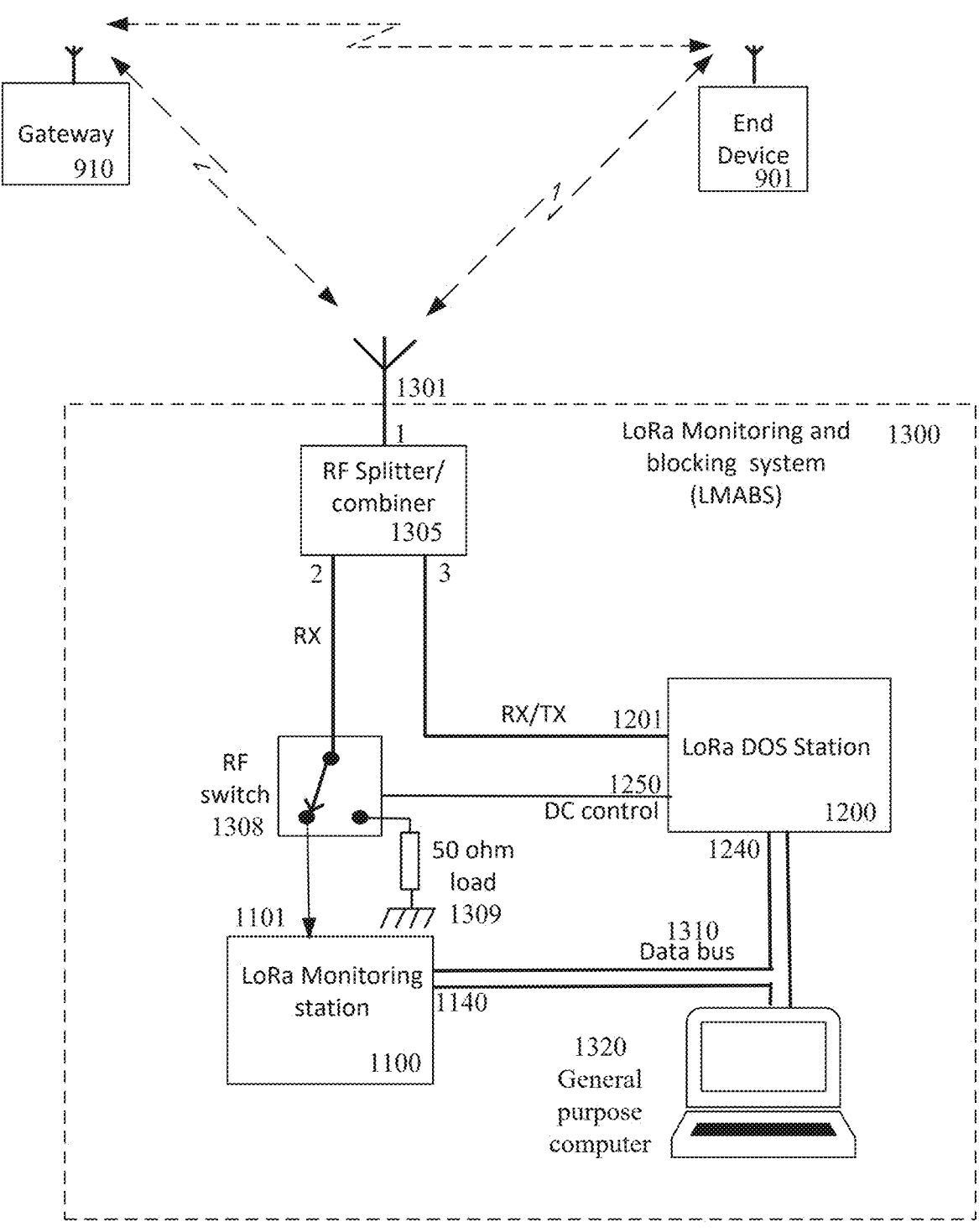
FIG. 13 is a block schematic diagram of an exemplary LoRa monitoring and blocking (LMAB) system, in accordance with some embodiments.

FIG. 13 is a block schematic diagram of an example LoRa Monitoring and Blocking (LMAB) system 1300. In some embodiments, the LMAB system 1300 includes an antenna 1301, an RF splitter/combiner 1305, an RF switch 1308, a LoRa Monitoring station 1100, a LoRa DOS station 1200, a data bus 1310, and a general purpose computer 1320.

In some embodiments, the general purpose computer 1320 may be used to control the operations of the LMAB system 1300 and in particular the LoRa monitoring station 1100 and the LoRa DOS station 1200. The general purpose computer 1320 may provide an interface to a user via a keyboard, mouse and display allowing a user to select the attributes of target stations, analyze received packets using a network analyzer, and control the start and stop of blocking signals 1000 from the LoRa DOS station 1200. In some embodiments the general purpose computer 1320 may comprise integrated circuitry (not shown) for processing and/or controlling, e.g., one or more processors and/or processor cores and/or FPGAs and/or ASICs configured to execute programmatic software instructions, and may include a memory module to execute programmatic code stored in the general purpose computer or another device. It is also noted that the elements of the LMAB system 1300 can be included in a single physical device/housing or can be distributed among several different physical devices/housings.

In some embodiments, RF signals, transmitted by either LoRa gateways 910 or LoRa end devices 901, are received at antenna 1301. The antenna 1301 is connected to port 1 of the RF splitter/combiner 1305. Port 2 of the RF splitter/combiner is connected to the common pole of the RF switch 1308. Port 3 of the RF splitter/combiner is connected to the antenna port 1201 of the LoRa DOS station 1200. The received signals may be received by the LoRa DOS station 1200, via port 3 of the RF splitter 1305. The received signals may be received by the LoRa monitoring station 1100, via port 2 of the RF splitter/combiner 1305 and the RF switch 1308. The RF switch 1308 is generally set to connect the received signals at antenna 1301 to the antenna port 1101 of the LoRa monitoring station 1100. The LMAB system 1300 may be configured to be in either a monitoring mode or a blocking mode.

When the LMAB system 1300 is in monitoring mode, LoRa monitoring station 1100 may demodulate the intercepted LoRa signals and either store the packet details in the memory 1122 and/or send them to the general purpose computer 1320 via the external data bus port 1140 and the data bus 1310 as may be instructed by the general purpose computer 1320. The general purpose computer 1320 may also instruct the LoRa monitoring station 1100 to measure and report attributes of the preamble upchirps of a particular LoRa target station, gateway 910 or end device 901. Such attributes may include signal strength, bandwidth (upchirp start and stop frequencies), spreading factor SF, symbol time, instantaneous carrier frequency offset (CFO), in-phase and quadrature (IQ) offsets, phase error, power amplifier nonlinearity, spectrum, and time-frequency statistics. These values can be used as a fingerprint for a LoRa target device, gateway 910 or end device 901.

As discussed above with reference to FIG. 10, in the disclosed DOS method the blocking signal 1000 is sent during the unmodulated upchirp part 801 of the preamble 701 of a received signal. Hence, the blocking signal 1000 is sent prior to the header 702 and the payload 703 (which may contain identity of the transmitting station). Therefore, the fingerprint can be used as an identification of a target LoRa device without the need to receive and demodulate the complete LoRa frame 700.

When the LMAB system 1300 is in blocking mode, the LoRa DOS station 1200 receives the intercepted LoRa preambles via antenna 1301, one output port of the splitter/combiner 1305, and the antenna port 1201. The LoRa DOS station 1200 may be configured by the general purpose computer 1320 to perform different DOS actions. By way of example and not limitation, such DOS actions may include:

DOS action A—monitor all received preambles and transmit blocking signal 1000 on all of them;

DOS action B—monitor all received preambles and transmit blocking signal 1000 if the received signal strength is above a preset threshold;

DOS action C—monitor all received preambles and transmit blocking signal 1000 if the received signal strength is below a preset threshold; and DOS action D—monitor all received preambles and transmit blocking signal 1000 if the received preamble attributes match a set of attributes provided by the general purpose computer 1320 to the LoRa DOS station 1200.

In DOS action A, all intercepted LoRa packets are blocked, providing DOS to both LoRa gateways 910 and LoRa end devices 901. In DOS action B, if the LMAB system 1300 is located close to a LoRa gateway, then by only blocking LoRa packets that are above a preset received signal level, effectively only packets being transmitted by that LoRa gateway may be selected and blocked. In DOS action C, again by locating the LMAB system 1300 close to a LoRa gateway, then by only blocking LoRa packets that are below a preset received signal level, effectively only packets being transmitted to that LoRa gateway are blocked (i.e., LoRa packets transmitted by LoRa end devices). In DOS action D, the LoRa DOS station 1200 may be configured to measure the preamble attributes of received preambles and to compare them to the attributes of target LoRa stations provided by the general purpose computer 1320. Only preambles that have a set of attributes that match the set of supplied attributes packets are blocked.

The blocking signal 1000, as discussed above with reference to FIG. 10, is transmitted by the LoRa DOS station 1200 via the antenna port 1201, the splitter/combiner 1305 and the antenna 1301. While the blocking signal 1000 is being transmitted, the LoRa DOS station 1200 sets the DC control 1250 which controls the RF switch 1308. This causes the RF switch 1308 to disconnect the received signal from the LoRa monitoring station 1100. The received signal from port 2 of the RF splitter/combiner 1305 is connected, via the RF switch 1308, to ground via a 50 ohm load 1309. Hence, the LoRa monitoring station 1100 does not receive the blocking signal 1000 but will receive the first 3.5 preamble upchirps, the sync word 802 and the rest of the packet. The result is that when the LMAB system 1300 is in blocking mode, the LoRa monitoring station 1100 does not re-synchronize to the blocking signal 1000 and is able to detect and demodulate the received LoRa frames 700 correctly.

Figure 14:
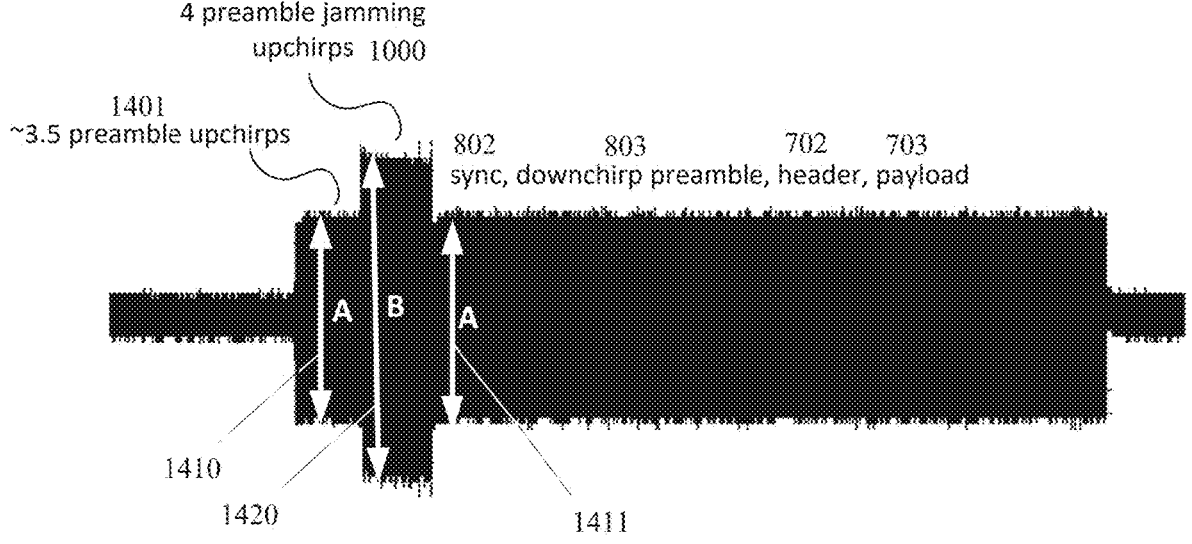
FIG. 14 is a graph of amplitude versus time for an example of a blocked packet at an antenna of a receiving LoRa device, in accordance with some embodiments.
Figure 15:
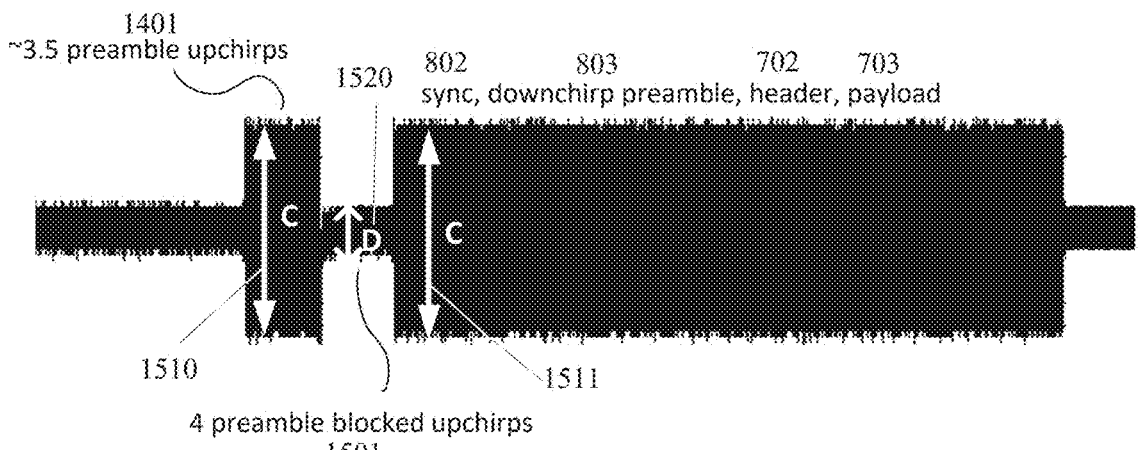
FIG. 15 is a graph of amplitude versus time for an example of an intercepted packet as received at an antenna port of a LoRa monitoring station, in accordance with some embodiments.

FIG. 14 is an example of an intercepted blocked packet, amplitude versus time, at the antenna of a receiving LoRa device (e.g., LoRa gateway 910 or LoRa end device 901, as shown in FIG. 13). The packet starts with the 3.5 preamble upchirps 1401 at amplitude A 1410. After about 3.5 upchirps, the blocking signal 1000, is transmitted by the LoRa DOS station 1200 and received at end device 901 at amplitude B 1420. Just before the sync word 802, the blocking signal 1000 ends, and the amplitude returns to amplitude A 1411 for the rest of the packet (i.e., sync word 802, downchirps 803, header 702 and payload 703). FIG. 15 is an example of the intercepted blocked packet, amplitude versus time, as received at the antenna port 1101 of the LoRa monitoring station 1100. The packet starts with the 3.5 preamble upchirps 1401 at amplitude C 1510. After about 3.5 upchirps, the blocking signal 1000, is transmitted by the LoRa DOS station 1200 and the RF switch 1308 is activated and connects the signal from port 2 of the RF splitter/combiner 1305 to the 50 ohm load 1309 to ground. This causes the signal 1501 at antenna port 1101 of the LoRa monitoring station 1100, to reduce to background noise level amplitude D 1520. Just before the sync word 802 of the LoRa preamble is received, the LoRa DOS station 1200 stops transmitting the blocking signal 1000, and causes the RF switch 1308 to change and re-connect the antenna port 1101 of the LoRa monitoring station 1100 to the received signal from the splitter/combiner 1305. The signal at the antenna port of LoRa monitoring station 1100 then returns to amplitude C 1511 for the rest of the packet (i.e., sync word 802, downchirps 803, header 702 and payload 703). In other words, the LoRa monitoring station 1100 is protected from the blocking signal 1000 and can successfully demodulate the received packet and details of all the LoRa packets received by the LoRa monitoring station 1100, including packets that have been blocked. The LoRa monitoring station 1100 can therefore make all packets available to the general purpose computer 1320 for analysis. By way of example and not limitation, packets that have been blocked may be examined and decisions as to whether to keep blocking them or not may be taken. Similarly, decisions as to which DOS action to use (i.e., DOS action A, B C or D) and/or whether to change the DOS action, may be made, based upon the decoded packets.

Figure 16:
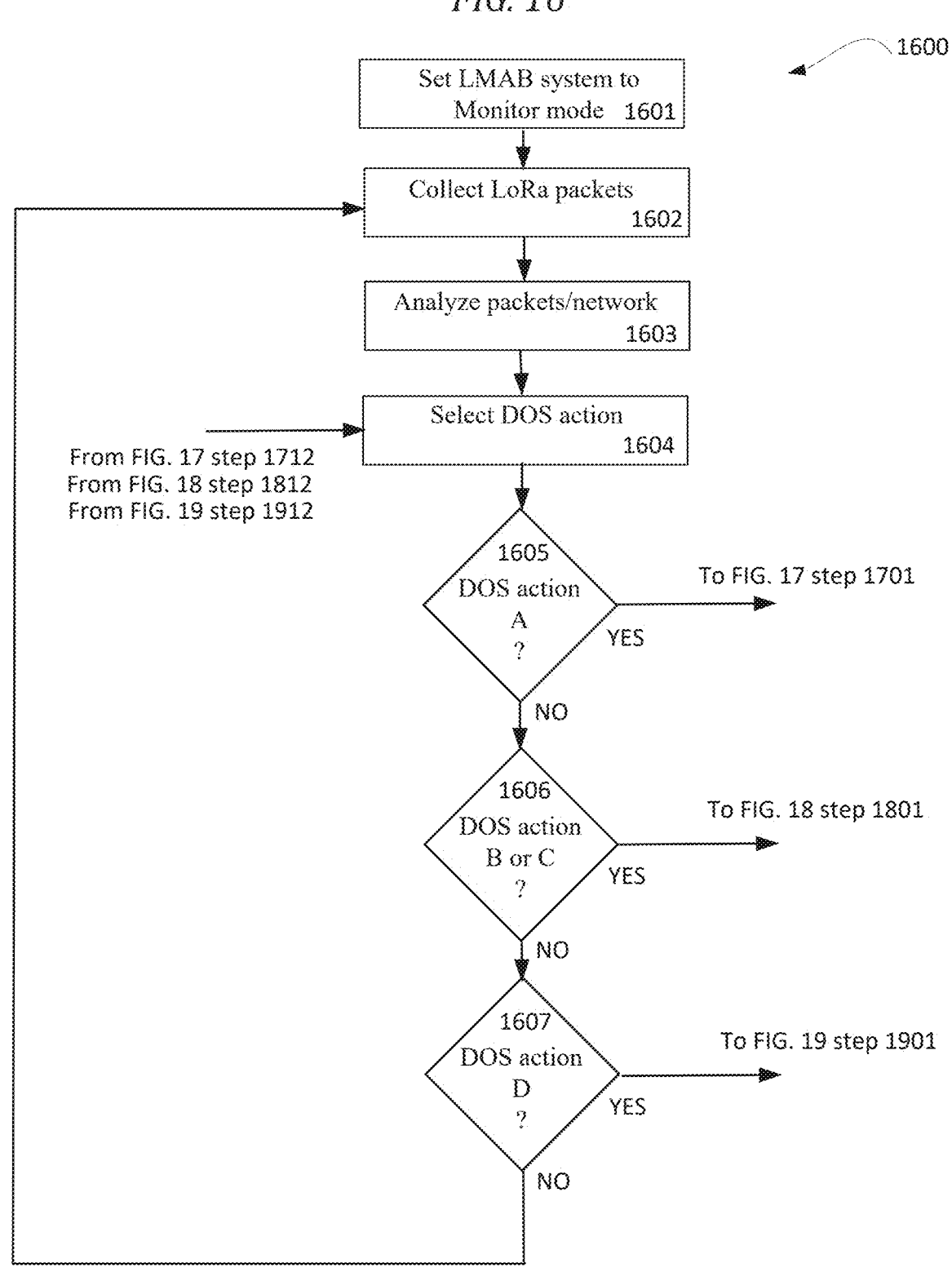
FIG. 16 is a flowchart of an exemplary process for the monitoring of LoRa packets and the selection of a DOS action, in accordance with some embodiments.

According to some embodiments, FIGS. 16, 17, 18 and 19 provide respective flowcharts of example processes 1600, 1700, 1800 and 1900 for the blocking of LoRa packets in LoRaWAN networks. FIG. 16 is a flowchart of example process 1600 for the monitoring of LoRa packets and the selection of a DOS action, according to some embodiments. Process 1600 starts at step 1601 where the LMAB system 1300 is set to monitor mode. At step 1602 LoRa packets are received by the LoRa monitoring station 1100, demodulated and stored. Packets may be received by the wideband front end 1111, the RF channelizer 1112 and the LoRa preamble detectors 1113, and then demodulated by a LoRa modem in the LoRa modems 1114. The demodulated packets may be stored in the packet collectors 1115. At step 1603 the packets are passed to the general purpose computer 1320 where they can be analyzed. At step 1604, the DOS action is selected.

As discussed above with reference to FIG. 13, by way of example and not limitation, such DOS actions may include (i) transmitting blocking signal 1000 for all received LoRa packets (DOS action A), (ii) transmitting blocking signal 1000 if the received signal strength (RSSI) is above a preset threshold (DOS action B), (iii) transmitting blocking signal 1000 if the received signal strength is below a preset threshold (DOS action C), and (iv) transmitting blocking signal 1000 if the attributes of the received preamble match a set of attributes provided by the general purpose computer 1320 to the LoRa DOS station 1200 (DOS action D). In one embodiment, the selection of the DOS action at step 1604 may be carried out by a user of the general purpose computer 1320. The user may carry out an analysis of the LoRa packet data that is provided by the LoRa monitoring station 1100 at step 1602 and passed to the general purpose computer 1320 at step 1603. In another embodiment, the general purpose computer 1320 may use an algorithm that selects the DOS action based upon a predefined set of criteria.

Figure 17:
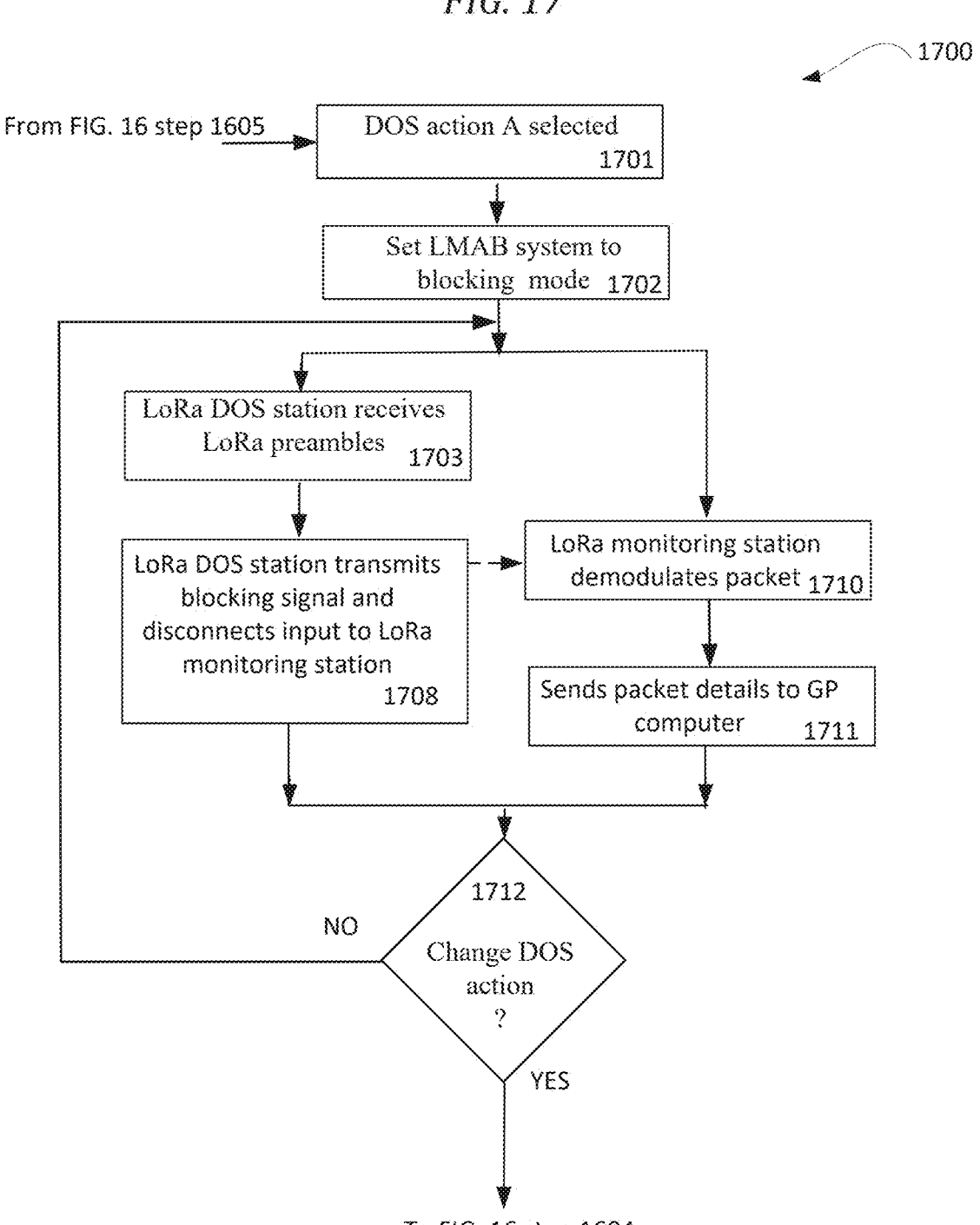
FIG. 17 is a flowchart of an exemplary process for a first DOS action, in accordance with some embodiments.

If DOS action A is selected, then at step 1605, the process continues at step 1701 of process 1700 shown in FIG. 17. If DOS actions B or C are selected, then at step 1606, the process continues at step 1801 of process 1800 shown in FIG. 18. If DOS action D is selected, then at step 1607, the process continues at step 1901 of process 1900 shown in FIG. 19. If no DOS action is set at step 1604, the process returns to step 1602.

FIG. 17 is a flowchart of example process 1700 for DOS action A (i.e., the blocking of all intercepted LoRa packets), according to some embodiments. Process 1700 starts at step 1701 where it is confirmed that DOS action A was selected at step 1604. At step 1702, the LMAB system 1300 is set to blocking mode. At step 1703, the LoRa DOS station 1200 receives LoRa preambles, and at step 1710, in parallel with step 1703, the LoRa monitoring station 1100 receives all received LoRa preambles and the rest of the LoRa frame 700. At step 1708, at a point corresponding to about 3.5 upchirps of the received LoRa preamble, the LoRa DOS station 1200 transmits the blocking signal 1000, as discussed above with reference to FIG. 10. Also, as discussed above with reference to FIG. 13, while transmitting the blocking signal 1000, the LoRa DOS station 1200 sets the DC control 1250 causing the RF switch 1308 to disconnect the received LoRa signal from the antenna port 1101 of the LoRa monitoring station 1100. The LoRa monitoring station 1100 will then, at step 1710, correctly demodulate the packet that has been blocked from reception by other LoRa stations (i.e., gateways 910 or end devices 901). At step 1711, the LoRa monitoring station 1100 sends the packet details to the general purpose computer 1320 where they can be analyzed by a user. At step 1712, a decision is made on whether to change the DOS action. If a change is made, then the process returns to process 1600 at step 1604. If no change is made, the process returns to steps 1703 and 1710.

FIG. 18 is a flowchart of example process 1800 for DOS actions B and C (i.e., the selective blocking of intercepted LoRa packets received above or below an RSSI threshold), according to some embodiments. Process 1800 starts at step 1801 where it is confirmed that at step 1604 DOS action B or C is selected and that an RSSI threshold value has been set. The RSSI threshold value may be set by a user of the general purpose computer 1320 based upon the packet analysis carried out at step 1603 of process 1600. At step 1802, the LMAB system 1300 is set to blocking mode. At step 1803, the LoRa DOS station 1200 receives LoRa preambles in parallel with step 1810, in which the LoRa monitoring station 1100 also receives every received LoRa preamble and LoRa frame 700. At step 1804, the LoRa DOS station 1200 measures the RSSI of the received preamble. At step 1805, it is checked if the DOS action B is selected, and if so, at step 1806 it is checked if the measured RSSI is greater than the RSSI threshold. If at step 1805, it is determined that the DOS action B was not selected, then at step 1807 it is assumed that DOS action C is selected, and it is checked if the received RSSI is less than the RSSI threshold. If either of the checks at steps 1806 and 1807 are true, then at step 1808, at a point corresponding to about 3.5 upchirps of the received LoRa preamble, the LoRa DOS station 1200 transmits a blocking signal 1000, as discussed above with reference to FIG. 10. Also, as discussed above with reference to FIG. 13, while transmitting the blocking signal 1000, the LoRa DOS station 1200 sets the DC control 1250 causing RF switch 1308 to disconnect received LoRa signal from the antenna port 1101 of the LoRa monitoring station 1100. The LoRa monitoring station 1100 can then, at step 1810, correctly demodulate the packet that has been blocked from reception by other LoRa stations (i.e., gateways 910 or end devices 901). At step 1811, the LoRa monitoring station 1100 sends the packet details to the general purpose computer 1320 where they can be analyzed by a user. At step 1812, a decision may be made to change the DOS action. If a change is made, then the process returns to step 1604 and if no change is made, the process returns to steps 1803 and 1810. If either of the checks at steps 1806 and 1807 are false, then the process returns to steps 1803 and 1810.

Figure 19:
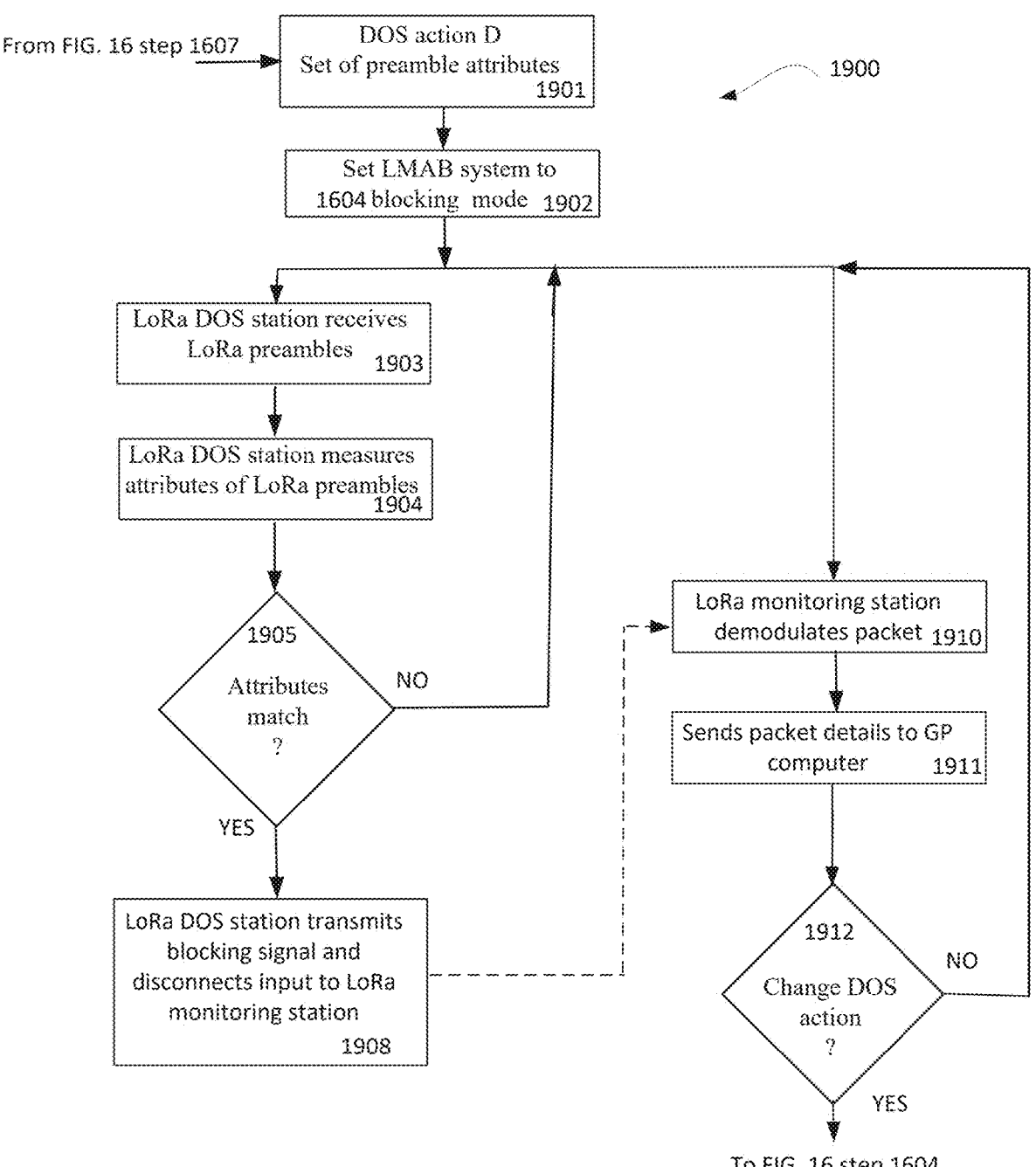
FIG. 19 is a flowchart of an exemplary process for a fourth DOS action, in accordance with some embodiments.

FIG. 19 is a flowchart of example process 1900 for DOS action D (i.e., the selective blocking of intercepted LoRa packets received with parameters that meet a set of attributes), according to some embodiments. Process 1900 starts at step 1901 where it is confirmed that DOS action D is selected at step 1603 and sets of LoRa preamble attributes have been received. These sets of attributes may be prepared by a user of the general purpose computer 1320 based upon the packet analysis carried out at step 1603 of process 1600. At step 1902, the LMAB system 1300 is set to blocking mode. At step 1903, the LoRa DOS station 1200 receives LoRa preambles in parallel with step 1910, in which the LoRa monitoring station 1100 also receives every received LoRa preamble and LoRa frames 700. At step 1904, the LoRa DOS station 1200 measures the attributes of the received preamble. At step 1905, it is checked if the measured attributes of the received preamble meet any set of the attributes received at step 1901. If the check at step 1905 is true, then at step 1908, at a point corresponding to about 3.5 upchirps of the received LoRa preamble, the LoRa DOS station 1200 transmits the blocking signal 1000, as discussed above with reference to FIG. 10. Also, as discussed above with reference to FIG. 13, while transmitting the blocking signal 1000, the LoRa DOS station 1200 sets the DC control 1250 causing RF switch 1308 to disconnect received LoRa signal from the antenna port 1101 of the LoRa monitoring station 1100. The LoRa monitoring station 1100 will then, at step 1910, correctly demodulate the packet that has been blocked from reception by other LoRa stations (i.e., gateways 910 or end devices 901). At step 1911, the LoRa monitoring station 1100 sends the packet details to the general purpose computer 1320 where a user may analyze them. At step 1912, a decision may be made to change the DOS action. If a change is made, then the process returns to step 1604 and if no change is made, the process returns to steps 1903 and 1910. If the check at step 1905 is false, then the process returns to returns to steps 1903 and 1910.

At step 1901, the LoRa DOS station is provided with sets of preamble attributes and at step 1904 the attributes of the received LoRa preambles are measured. The LoRa DOS station measures and checks the attributes using just the first 3 unmodulated upchirps of the preamble. The upchirp attributes may include precise measurements of the received signal strength (RSSI), start and stop frequencies, $f_0$ 11 and $f_1$ 12 respectively, the symbol time $T_{sym}$ 15, and the bandwidth B for different channels on which transmissions from the target LoRa station(s) may be detected. Other attributes may include symbol time, instantaneous carrier frequency offset (CFO), in-phase and quadrature (IQ) offsets, phase error, power amplifier nonlinearity, spectrum, and time-frequency statistics. These measurements and preamble attributes may be used as fingerprints (i.e., an identity) for different LoRa stations. The fingerprint measurements may be carried out by the processor 1121. The packet details and metadata may be stored in memory 1122 under the command of the processor circuitry 1120. The information may be sent via the data bus interface 1123, the external data port 1140 and the data bus 1310 to the general purpose computer 1320. A user of the general purpose computer 1320 may investigate and analyze the received packets, using, for example, a network analyzer, and may select the sets of attributes to be used.

DOS actions A, B, C, and D are discussed above with reference to FIG. 13. In a LoRaWAN network, as discussed above with reference to FIG. 9, a gateway 910 does not have a network address, hence the attributes of a fingerprint may be used as an identity of a specific gateway 910. Locating the LMAB system 1300 in relation to the LoRa devices in a particular LoRaWAN network is important. In order to block a LoRa frame 700, the blocking signal 1000 must be received at the LoRa receiving station at a signal level 4 to 9 dB higher than the received LoRa frame 700. Generally, the LMAB system 1300 may be placed in the vicinity of a LoRa gateway 910 since in a LoRaWAN network a gateway 910 transmits packets at a much higher rate than end devices 901.

If DOS action A is selected, then all intercepted LoRa packets cause the blocking signal 1000 to be sent. This would have the effect of blocking packets sent to and sent by the gateway. If DOS action B is selected, then only intercepted LoRa packets with higher RSSI values cause the blocking signal 1000 to be sent. This has the general effect of only blocking packets sent by the gateway 910. If DOS action C is selected, then only intercepted LoRa packets with low RSSI values cause the blocking signal 1000 to be sent. This has the general effect of only blocking packets sent to the gateway 910. If DOS action D is selected, then only intercepted LoRa packets that match a fingerprint cause the blocking signal 1000 to be sent. This has the general effect of only blocking packets sent by a specific LoRa station (i.e., gateway 910 or end device 901). Because DOS action D involves more detailed measurements and analysis than DOS actions A, B, and C, DOS actions A, B, and C may be preferred.

SOME EMBODIMENTS

Some embodiments may include any of the following:

A1. A method for monitoring and blocking data packets while maintaining the ability to demodulate blocked data packets including receiving, at a receiver, a first data packet; analyzing a first portion of the first data packet to determine one or more attributes of the first data packet; transmitting, from a transmitter, a blocking signal based on the one or more attributes of the first data packet; discontinuing receipt of the first data packet at the receiver during transmission of the blocking signal; continuing receipt of a remainder of the first data packet at the receiver following transmission of the blocking signal; and demodulating, at the receiver, data included in the remainder of the first data packet.

A2. The method of clause A1 can include any of the following components or features, in any combination. The first portion of the first data packet corresponds to a first portion of a preamble of the first data packet. Transmitting the blocking signal comprises transmitting the blocking signal to block a second portion of the preamble that follows the first portion of the preamble. Analyzing the first portion of the first data packet to determine the one or more attributes includes determining a spreading factor SF and a bandwidth B of each chirp in a plurality of first chirps included in the first portion of the first data packet. Transmitting the blocking signal based on the first portion of the first data packet includes generating the blocking signal to include a plurality of second chirps with the SF and B of the plurality of first chirps. Transmitting the blocking signal includes selectively transmitting the blocking signal based on at least one attribute of the first data packet. The first data packet is a Long-Range (LoRa) data packet. The method includes recording, at the receiver, received signal strengths of a plurality of first LoRa data packets; determining a signal level threshold based on the received signal strengths of the plurality of first LoRa data packets, wherein the signal level threshold identifies data packets transmitted by LoRa gateways in proximity to the receiver; receiving, at the receiver, a second LoRa data packet; analyzing a first portion of a preamble of the second LoRa data packet to determine a received signal strength of the second LoRa data packet; comparing the received signal strength of the second LoRa data packet to the signal level threshold; and in response to determining that the receive signal strength of the second LoRa data packet is greater than the signal level threshold, transmitting a LoRa blocking signal to block a second portion of the preamble of the second LoRa data packet. The method includes recording, at the receiver, received signal strengths of a plurality of first LoRa data packets; determining a signal level threshold based on the received signal strengths of the plurality of first LoRa data packets, wherein the signal level threshold identifies data packets transmitted by LoRa gateways not in proximity to the receiver; receiving, at the receiver, a second LoRa data packet; analyzing a first portion of a preamble of the second LoRa data packet to determine a received signal strength of the second LoRa data packet; comparing the received signal strength of the second LoRa data packet to the signal level threshold; and in response to determining that the receive signal strength of the second LoRa data packet is less than the signal level threshold, transmitting a LoRa blocking signal to block a second portion of the preamble of the second LoRa data packet. The method includes recording, at the receiver, one or more attributes of a plurality of first LoRa data packets; generating sets of reference attributes corresponding to different LoRa devices based on the one or more attributes of the plurality of first LoRa data packets; receiving, at the receiver, a second LoRa data packet; analyzing a first portion of a preamble of the second LoRa data packet to determine one or more attributes of the second LoRa data packet; comparing the one or more attributes of the second LoRa data packet to the sets of reference attributes; and in response to determining that the one or more attributes of the second LoRa data packet match one of the sets of reference attributes, transmitting a LoRa blocking signal to block a second portion of the preamble of the second LoRa data packet.

A3. A system configured to monitor and block data packets while maintaining the ability to demodulate blocked data packets including at least one memory device with computer-executable instructions stored thereon; and at least one processor for executing the computer-executable instructions stored on the at least one memory device. Execution of the computer-executable instructions by the at least one processor causes the at least one processor to perform operations including receiving, at a receiver, a first data packet; analyzing a first portion of the first data packet to determine one or more attributes of the first data packet; transmitting, from a transmitter, a blocking signal based on the one or more attributes of the first data packet; discontinuing receipt of the first data packet at the receiver during transmission of the blocking signal; continuing receipt of a remainder of the first data packet at the receiver following transmission of the blocking signal; and demodulating, at the receiver, a partial version of the first data packet, as received by the receiver, wherein the partial version of the first data packet includes the first portion of the first data packet and the remainder of the first data packet.

A4. A method in a long range (LoRa) monitoring and blocking (LMAB) system, for the monitoring of LoRa packets across all channels and the precision blocking of LoRa packets while maintaining the ability to demodulate the blocked packet, the method including: receiving and demodulating LoRa packets in a first LoRa receiver; analyzing the LoRa packet details; receiving LoRa packet preambles at a second LoRa receiver; determining from the first 3 unmodulated upchirps of the LoRa preamble, the spreading factor (SF) and bandwidth (B) of the upchirps; transmitting from a first LoRa transmitter, a blocking signal which includes a number of unmodulated upchirps, the blocking signal ending before the reception of the sync word of the received LoRa preamble; disconnecting the received LoRa packet from the input to the first LoRa receiver for the duration of the blocking signal; receiving and successfully demodulating the blocked LoRa packet at the first LoRa receiver; measuring none, one or more attributes of the preambles of the packets; identifying and storing the packet preamble attributes; selecting none, one or more preamble attributes and providing them to a second LoRa receiver that is co-located with the first LoRa receiver; receiving LoRa packet preambles at the second LoRa receiver and examining their attributes to determine if they match the provided attributes; and, if the attributes match; at a first LoRa transmitter transmitting a series of unmodulated upchirp blocking signals; and temporarily disconnecting the received signal from the input of the first LoRa receiver for the duration of the blocking signals such that the packet is correctly received at the first LoRa receiver.

A5. The method of clause A4 can include any of the following components or features, in any combination. The first LoRa receiver, the second LoRa receiver and the first LoRa transmitter are all co-located; the method further including: recording the received signal strengths of the LoRa packets received by the first LoRa receiver; analyzing the signal strengths and packet details to determine a receive signal level threshold value that identifies LoRa packets transmitted by a LoRa gateway that is close in proximity to the co-located first and second LoRa receivers; receiving LoRa packet preambles at the second LoRa receiver and examining their signal levels to determine if they exceed the receive signal level threshold; and transmitting from the first LoRa transmitter, a blocking signal only if the received signal strength of the LoRa preamble is greater than the threshold value. The first LoRa receiver, the second LoRa receiver and the first LoRa transmitter are all co-located; the method further including: recording the received signal strengths of the LoRa packets received by the first LoRa receiver; analyzing the signal strengths and packet details to determine a receive signal level threshold value that identifies LoRa packets not transmitted by a LoRa gateway that is close in proximity to the co-located first and second LoRa receivers; receiving LoRa packet preambles at the second LoRa receiver and examining their signal levels to determine if they exceed the receive signal level threshold; and transmitting from the first LoRa transmitter, a blocking signal only if the received signal strength of the LoRa preamble is less than the threshold value. The first LoRa receiver, the second LoRa receiver and the first LoRa transmitter are all co-located; the method further including: recording one or more attributes of the preambles of the packets received by the first LoRa receiver; identifying and storing the packet preamble attributes; analyzing the attributes and the packet details to create sets of attributes to select LoRa devices; providing the sets of preamble attributes to the second LoRa receiver; receiving LoRa packet preambles at the second LoRa receiver and examining their attributes to determine if they meet a set of provided attributes; and transmitting from the first LoRa transmitter, a blocking signal only if the attributes of the LoRa preamble agree with a provided set of attributes. The attributes include measurements of one or more of: signal strength, upchirp start and end frequencies, bandwidth, symbol time.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for example: the fingerprint data and meta data, the number of channels covered by the LMAB system, and the start and stop times of the blocking signal 1000. Accordingly, the scope should be determined not by the embodiments illustrated, but by the claims and embodiments.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope.

What is claimed is:

1. A method for monitoring and blocking data packets while maintaining the ability to demodulate blocked data packets, the method comprising:
  receiving, at a receiver, a first data packet;
  analyzing a first portion of the first data packet to determine one or more attributes of the first data packet;
  transmitting, from a transmitter, a blocking signal based on the one or more attributes of the first data packet;
  discontinuing receipt of the first data packet at the receiver during transmission of the blocking signal;
  continuing receipt of a remainder of the first data packet at the receiver following transmission of the blocking signal; and
  demodulating, at the receiver, data included in the remainder of the first data packet.

2. The method of claim 1, wherein the first portion of the first data packet corresponds to a first portion of a preamble of the first data packet.

3. The method of claim 2, wherein transmitting the blocking signal comprises transmitting the blocking signal to block a second portion of the preamble that follows the first portion of the preamble.

4. The method of claim 1, wherein analyzing the first portion of the first data packet to determine the one or more attributes comprises determining a spreading factor SF and a bandwidth B of each chirp in a plurality of first chirps included in the first portion of the first data packet.

5. The method of claim 4, wherein transmitting the blocking signal based on the first portion of the first data packet comprises generating the blocking signal to include a plurality of second chirps with the SF and B of the plurality of first chirps.

6. The method of claim 1, wherein transmitting the blocking signal comprises selectively transmitting the blocking signal based on at least one attribute of the first data packet.

7. The method of claim 1, wherein the first data packet is a Long-Range (LoRa) data packet.

8. The method of claim 7, further comprising:
  recording, at the receiver, received signal strengths of a plurality of first LoRa data packets;
  determining a signal level threshold based on the received signal strengths of the plurality of first LoRa data packets, wherein the signal level threshold identifies data packets transmitted by LoRa gateways in proximity to the receiver;
  receiving, at the receiver, a second LoRa data packet;
  analyzing a first portion of a preamble of the second LoRa data packet to determine a received signal strength of the second LoRa data packet;
  comparing the received signal strength of the second LoRa data packet to the signal level threshold; and
  in response to determining that the receive signal strength of the second LoRa data packet is greater than the signal level threshold, transmitting a LoRa blocking signal to block a second portion of the preamble of the second LoRa data packet.

9. The method of claim 7, further comprising:
  recording, at the receiver, received signal strengths of a plurality of first LoRa data packets;
  determining a signal level threshold based on the received signal strengths of the plurality of first LoRa data packets, wherein the signal level threshold identifies data packets transmitted by LoRa gateways not in proximity to the receiver;

receiving, at the receiver, a second LoRa data packet;

analyzing a first portion of a preamble of the second LoRa data packet to determine a received signal strength of the second LoRa data packet;

comparing the received signal strength of the second LoRa data packet to the signal level threshold; and in response to determining that the receive signal strength of the second LoRa data packet is less than the signal level threshold, transmitting a LoRa blocking signal to block a second portion of the preamble of the second LoRa data packet.

10. The method of claim 7, further comprising:

recording, at the receiver, one or more attributes of a plurality of first LoRa data packets;

generating sets of reference attributes corresponding to different LoRa devices based on the one or more attributes of the plurality of first LoRa data packets;

receiving, at the receiver, a second LoRa data packet;

analyzing a first portion of a preamble of the second LoRa data packet to determine one or more attributes of the second LoRa data packet;

comparing the one or more attributes of the second LoRa data packet to the sets of reference attributes; and in response to determining that the one or more attributes of the second LoRa data packet match one of the sets of reference attributes, transmitting a LoRa blocking signal to block a second portion of the preamble of the second LoRa data packet.

11. A system configured to monitor and block data packets while maintaining the ability to demodulate blocked data packets, the system comprising:

at least one memory device with computer-executable instructions stored thereon; and at least one processor for executing the computer-executable instructions stored on the at least one memory device, wherein execution of the computer-executable instructions by the at least one processor causes the at least one processor to perform operations comprising:

receiving, at a receiver, a first data packet;

analyzing a first portion of the first data packet to determine one or more attributes of the first data packet;

transmitting, from a transmitter, a blocking signal based on the one or more attributes of the first data packet;

discontinuing receipt of the first data packet at the receiver during transmission of the blocking signal;

continuing receipt of a remainder of the first data packet at the receiver following transmission of the blocking signal; and demodulating, at the receiver, data included in the remainder of the first data packet.

12. The system of claim 11, wherein the first portion of the first data packet corresponds to a first portion of a preamble of the first data packet.

13. The system of claim 12, wherein transmitting the blocking signal comprises transmitting the blocking signal to block a second portion of the preamble that follows the first portion of the preamble.

14. The system of claim 11, wherein analyzing the first portion of the first data packet to determine the one or more attributes comprises determining a spreading factor SF and a bandwidth B of each chirp in a plurality of first chirps included in the first portion of the first data packet.

15. The system of claim 14, wherein transmitting the blocking signal based on the first portion of the first data packet comprises generating the blocking signal to include a plurality of second chirps with the SF and B of the plurality of first chirps.

16. The system of claim 11, wherein transmitting the blocking signal comprises selectively transmitting the blocking signal based on at least one attribute of the first data packet.

17. The system of claim 11, wherein the first data packet is a Long-Range (LoRa) data packet.

18. The system of claim 17, wherein execution of the computer-executable instructions by the at least one processor causes the at least one processor to perform operations further comprising:

recording, at the receiver, received signal strengths of a plurality of first LoRa data packets;

determining a signal level threshold based on the received signal strengths of the plurality of first LoRa data packets, wherein the signal level threshold identifies data packets transmitted by LoRa gateways in proximity to the receiver;

receiving, at the receiver, a second LoRa data packet;

analyzing a first portion of a preamble of the second LoRa data packet to determine a received signal strength of the second LoRa data packet;

comparing the received signal strength of the second LoRa data packet to the signal level threshold; and in response to determining that the receive signal strength of the second LoRa data packet is greater than the signal level threshold, transmitting a LoRa blocking signal to block a second portion of the preamble of the second LoRa data packet.

19. The system of claim 17, wherein execution of the computer-executable instructions by the at least one processor causes the at least one processor to perform operations further comprising:

recording, at the receiver, received signal strengths of a plurality of first LoRa data packets;

determining a signal level threshold based on the received signal strengths of the plurality of first LoRa data packets, wherein the signal level threshold identifies data packets transmitted by LoRa gateways not in proximity to the receiver;

receiving, at the receiver, a second LoRa data packet;

analyzing a first portion of a preamble of the second LoRa data packet to determine a received signal strength of the second LoRa data packet;

comparing the received signal strength of the second LoRa data packet to the signal level threshold; and in response to determining that the receive signal strength of the second LoRa data packet is less than the signal level threshold, transmitting a LoRa blocking signal to block a second portion of the preamble of the second LoRa data packet.

20. The system of claim 17, wherein execution of the computer-executable instructions by the at least one processor causes the at least one processor to perform operations further comprising:

recording, at the receiver, one or more attributes of a plurality of first LoRa data packets;

generating sets of reference attributes corresponding to different LoRa devices based on the one or more attributes of the plurality of first LoRa data packets;

receiving, at the receiver, a second LoRa data packet;

analyzing a first portion of a preamble of the second LoRa data packet to determine one or more attributes of the second LoRa data packet;

comparing the one or more attributes of the second LoRa data packet to the sets of reference attributes; and in response to determining that the one or more attributes of the second LoRa data packet match one of the sets of reference attributes, transmitting a LoRa blocking signal to block a second portion of the preamble of the second LoRa data packet.

* * * * *